(12) United States Patent
Crane et al.

(10) Patent No.: US 11,340,915 B2
(45) Date of Patent: May 24, 2022

(54) ENCACHING AND SHARING TRANSFORMED LIBRARIES

(71) Applicant: RUNSAFE SECURITY, INC., McLean, VA (US)

(72) Inventors: Stephen James Crane, Irvine, CA (US); Andrei Homescu, Irvine, CA (US)

(73) Assignee: RUNSAFE SECURITY, INC., McLean, VA (US)

( * ) Notice: Subject to any disclaimer, the term of this patent is extended or adjusted under 35 U.S.C. 154(b) by 49 days.

(21) Appl. No.: 17/104,320

(22) Filed: Nov. 25, 2020

(65) Prior Publication Data

US 2021/0157612 A1 May 27, 2021

Related U.S. Application Data

(60) Provisional application No. 62/940,292, filed on Nov. 26, 2019.

(51) Int. Cl.
*G06F 9/445* (2018.01)
*G06F 9/54* (2006.01)
*G06F 16/2455* (2019.01)

(52) U.S. Cl.
CPC .......... *G06F 9/44521* (2013.01); *G06F 9/54* (2013.01); *G06F 16/24552* (2019.01); *G06F 16/24558* (2019.01)

(58) Field of Classification Search
CPC .. G06F 9/44521; G06F 9/54; G06F 16/24552; G06F 16/24558

(Continued)

(56) References Cited

U.S. PATENT DOCUMENTS 10,409,507 B1 * 9/2019 Huang et al. ....... G06F 9/44521
2003/0023964 A1 * 1/2003 Rajaram et al. .... G06F 9/44521
717/172

(Continued)

OTHER PUBLICATIONS

Pieter Maene et al., "Hardware-Based Trusted Computing Architectures for Isolation and Attestation", IEEE, Year: 2018, vol. 67, Issue 3, pp. 361-374 (Year: 2018).*

(Continued)

*Primary Examiner* — Wei Y Zhen
*Assistant Examiner* — Mohammed N Huda
(74) *Attorney, Agent, or Firm* — Perkins Coie LLP

(57) ABSTRACT

Embodiments disclosed herein are directed at applying transformations to computer code residing in original libraries for protection against cyberattacks. For example, the transformations applied on original libraries cause random reorganization of the computer code resulting in a transformed version of an original library. Although a malicious attacker can utilize a known exploit of the original library and launch a cyberattack, such knowledge is of no use on the transformed version of the original library. In some embodiments, the transformed version of the original library is stored in cache memory and shared by multiple executable programs to facilitate efficient memory utilization. By making updates to information within the memory occupied by the executable program, the connection between the transformed version of the original library and the executable program is established, when the executable program attempts to access the functional blocks of the original library, which can be released from memory.

19 Claims, 11 Drawing Sheets

(58) Field of Classification Search
USPC ......................................................... 717/164
See application file for complete search history.

(56) References Cited

U.S. PATENT DOCUMENTS

| | | |
|---|---|---|
| 2015/0163248 A1 | 6/2015 | Epstein |
| 2015/0347756 A1 | 12/2015 | Hidayat et al. |
| 2016/0342793 A1 | 11/2016 | Hidayat et al. |
| 2017/0206357 A1 | 7/2017 | Gorelik et al. |
| 2017/0286066 A1* | 10/2017 | Gathala et al. ...... G06F 9/44521 |
| 2019/0253441 A1* | 8/2019 | Horstmeyer et al. ........................ H04L 63/1425 |
| 2020/0021560 A1* | 1/2020 | Hefley et al. ............. G06F 9/54 |

OTHER PUBLICATIONS

International Search Report and Written Opinion of International Application No. PCT/US2020/062185; dated Apr. 12, 2021; 12 pages.
Puschel, et al., "SPIRAL: Code generation for DSP transforms," Proceedings of the IEEE 93.2, Jun. 27, 2005; pp. 232-275.

* cited by examiner

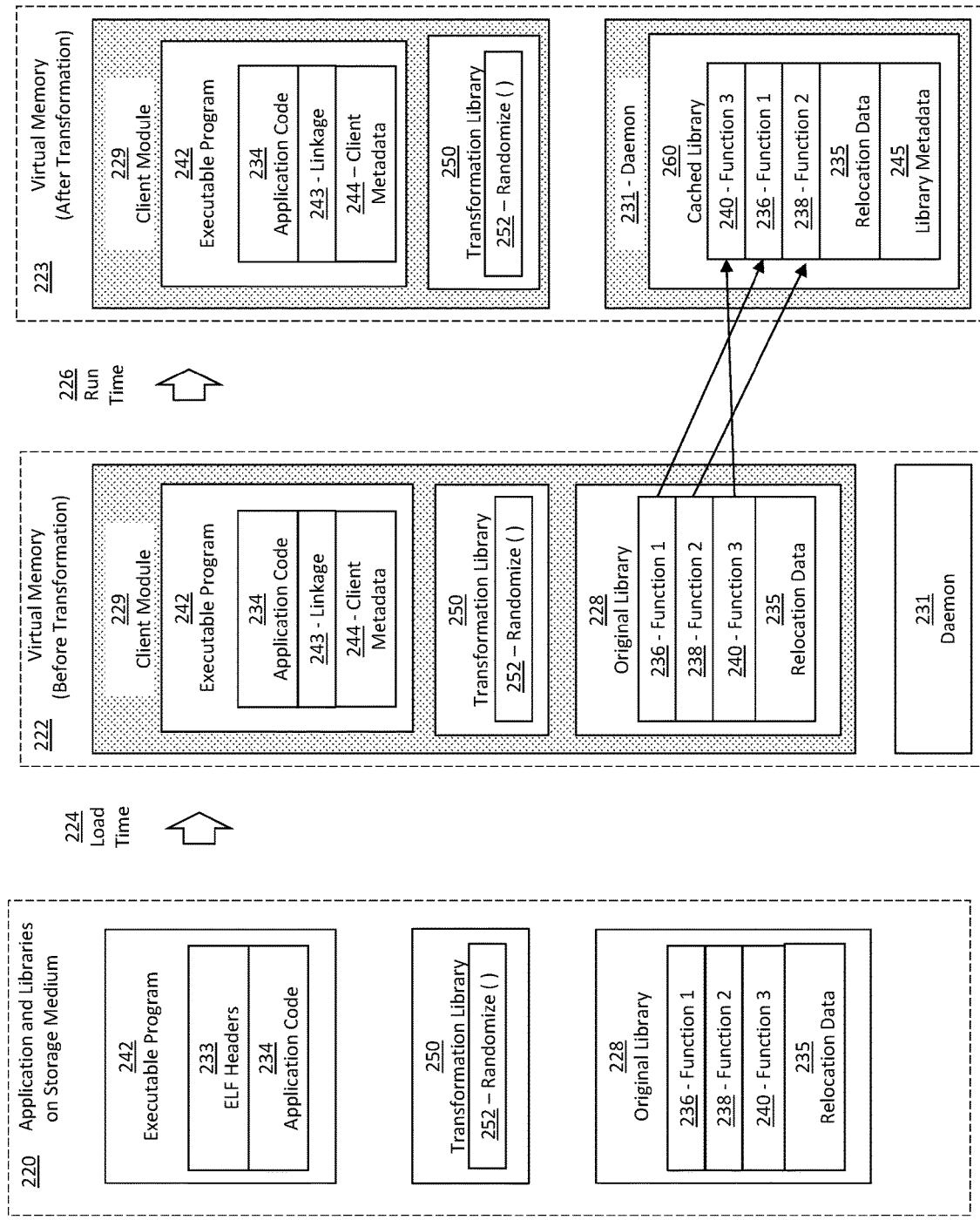

ENCACHING AND SHARING TRANSFORMED LIBRARIES

CROSS-REFERENCE TO RELATED APPLICATION

This application claims the benefit of U.S. Provisional Application No. 62/940,292 filed on Nov. 26, 2019, which is hereby incorporated by reference in its entirety.

TECHNICAL FIELD

The present technology provides a method and system to increase the operating efficiency of a computer system. Specifically, disclosed methods, systems, and devices are directed toward increasing defenses of computer systems associated with enabling sharing of libraries and software binaries and providing protection against cyberattacks.

BACKGROUND

Software libraries help decrease development time and increase code reusability. In some instances, a library is a collection of computer code, written in terms of a language, that has a well-defined interface by which the behavior is invoked. For instance, people who want to write a higher-level program can use a library to make system calls instead of implementing those system calls over and over again. In addition, the library can be reused by multiple independent programs. Typically, a program invokes the library-provided behavior via a mechanism of the language. For example, in a language such as C, the behavior in a library is invoked by using C's normal function-call. What distinguishes the call as being to a library function, versus being to another function in the same program, is the way that the code is organized in the system. For example, a C programmer may use a statement such as printf "Hello World" and include the stdio.h header file of the C Standard Library to display a line of text on a computer monitor. By including the header file in the program's source code, the program will dynamically link the shared library, libc.so, which includes the underlying code for several functions, including printf. However, relying on a software library may present a cybersecurity risk in many scenarios. Thus, there is a need to protect a library from cyberattacks while making the library available for reuse.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure but are intended to be illustrative only.

FIGS. 3A-3C show conceptual block diagrams at various stages of creating a cached library from an original library, in accordance with an embodiment of the present disclosure.

DETAILED DESCRIPTION

Embodiments disclosed herein are directed at applying transformations to computer code residing in an original library that is dynamically linked to an executable program. The transformations provide protection against cyberattacks and reside in a transformation library that is also dynamically linked to the executable program. For example, the transformations applied on original libraries cause random reorganization of the computer code resulting in a transformed version of an original library. Although a malicious attacker can utilize a known exploit of the original library and launch a cyberattack, such knowledge is of no use on the transformed version of the original library. In some embodiments, the transformed version of the original library is stored in cache memory and shared by multiple executable programs to facilitate efficient memory utilization By making updates to information within memory occupied by the executable program using the file descriptor of a file storing the cached library and the data describing structures/layouts of the original library and the cached library, the connection between the transformed version of the original library and the executable program is established, when the executable program attempts to access the functional blocks of the original library, which can be released from memory. In some embodiments, functionality of a daemon is disclosed. The daemon can manage efficient access to the transformed version of the original library by multiple executable programs, resulting in reduced memory consumption. The systems and methods of the present disclosure can be applied across many different operating systems and processors (e.g., Linux®, UNIX, Windows®). At least a few patentable benefits of the present technology include methods for efficiently utilizing computer memory and providing protection to the executable program and/or libraries associated with the executable program against cyberattacks by malicious hackers.

Figure 1:
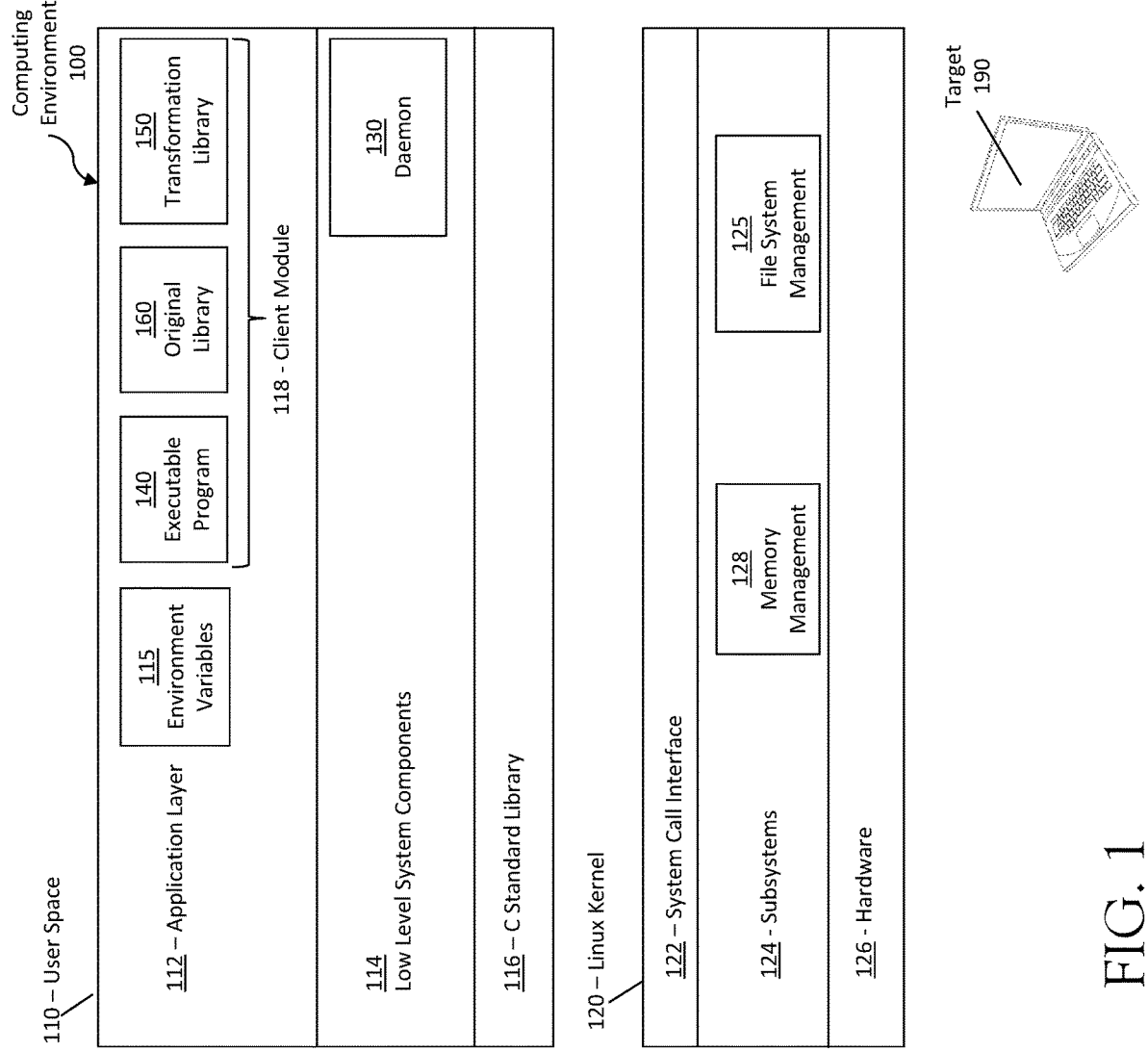
FIG. 1 shows an example operating system architecture for a system, in accordance with an embodiment of the present disclosure.

FIG. 1 shows a Linux® system architecture diagram as the computing environment 100 illustrating the hierarchy of the operating system on a target system 190. FIG. 1 shows the target system 190 as a computer, but the process may take place on various computing systems, such as, but not limited to, smartwatches, tablets, embedded systems, servers, etc. The computing environment 100 comprises the Linux® kernel 120 and the user space 110. The Linux® kernel 120 performs critical tasks including allocating and enforcing protection of system memory, accessing data, scheduling processes, and security access. The user space 110 includes an application layer 112, low-level system components 114, and a standard C library 116. Low-level system components 114 can include a daemon 130.

The Linux Kernel 120 includes the system call interface 122, one or more underlying subsystems 124, and hardware 126. The subsystems 124 can include the memory management system 128 and the file system management 125. The file system management 125 coordinates the organization and activities between various storage mediums including hard drives as well as the in-memory file system. The memory management system 128 provides oversight and coordination of the virtual and physical memory space within the computing environment 100. Coordination between the memory management system 128 and the file system management 125 enables the loading of programs in and out of memory.

Shown in the user space 110 are the elements that can be used to perform tasks beyond the management of the computing system. The executable program 140 is written to use a dynamic library (e.g., the standard C library 116) and an original library 160. In addition, the executable program is built to utilize a binary transformation, which is defined in the transformation library 150 (alternatively termed herein as Load-time Function Randomization (LFR) library or libLFR) for the purpose of enabling a high level of security against cyberattacks.

The term binary transformation, or simply transformation, is used to describe a method for reorganizing the layout of a binary file. The use of the prefix binary to describe a file is common in computer programming to imply any suitable file type. Binary files generally refer to files including information that is formatted for understanding only by microprocessors. Examples of formats can include executable files and compiled libraries. The term transformation (as used in binary transformation) reflects the change from a first arrangement to an alternative second arrangement that has the same functionality as the first arrangement. While executable programs and libraries are most relevant to this disclosure, the technology disclosed has further applicability to include other types of binaries, such as database formats. In some embodiments, a binary transformation is defined by one or more functions in the transformation library 150 that causes obfuscation or reorganization of the contents of the original library 160 arranged in memory. The functions in the transformation library 150 can be called immediately after the client module is loaded into memory. In some embodiments, the obfuscation of the contents of the original library (simply referred to as randomization) includes randomly reordering the functions or functional blocks of the original library residing in the system memory and subsequently performing operations to update linkages between the executable program and the reorganized functions.

Collectively, the executable program 140, the original library 160, and the transformation library 150 are regarded as a client module 118. The application layer 112 includes one or more environment variables 115 which can be used to pass information, such as settings and other information, between elements at various layers within the computing environment. For example, environment variables can be used to pass information to the daemon 130.

The transformation library 150 in FIG. 1 is shown as being a dynamically linked library loaded in the user space 110. The loading of the transformation library 150 into system memory may be accomplished in multiple ways. For example, the transformation library 150 can be dynamically loaded into system memory at the load time of an executable program that references the transformation library 150. As another example, the transformation library 150 can be loaded by a user from the command line interface utilizing an interface such as LD_PRELOAD. As yet another example, the transformation library 150 can be loaded by executable program (or, process) A and accessed by executable program B. In some embodiments, the functions and functionality residing in transformation library 150 may be statically linked or embedded into other elements of the client module during the compilation or linking process.

An additional element appearing in FIG. 1 is daemon 130 which resides in the low-level components of the user space. The daemon 130 runs continuously or unobtrusively as a background process to handle service requests from the transformation library 150. Additionally, the daemon 130 is configured to manage access to a library stored in a memory cache in environments where the library can be shared among more than two executable programs. While the operating system start-up process may vary across hardware platforms or user configurations, the daemon 130 is commonly loaded onto the target system 190 at an early stage during the operating system start-up process.

Figure 2B:
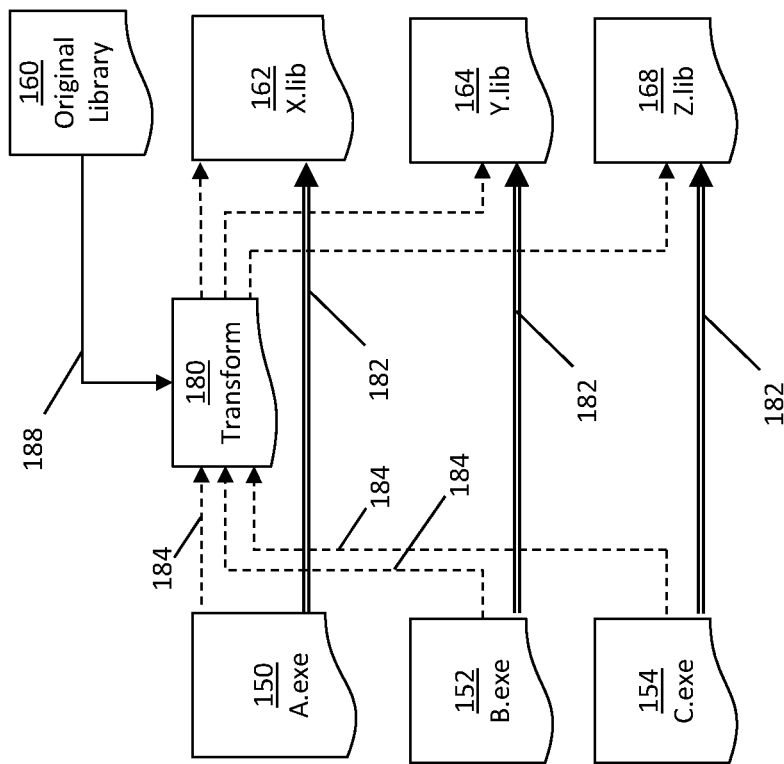
FIG. 2B is a second use-case associated with a library shared by multiple executable programs, in accordance with an embodiment of the present disclosure.
Figure 2A:
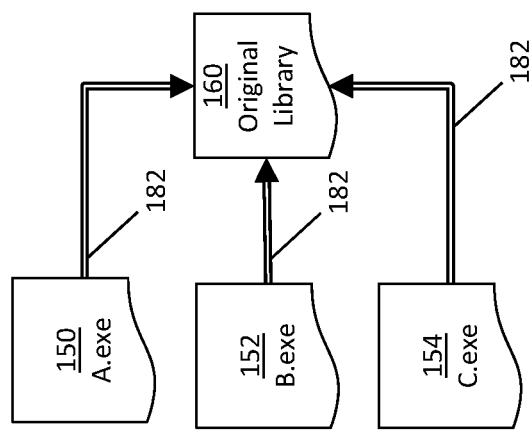
FIG. 2A is a first use-case associated with a library shared by multiple executable programs.
Figure 2C:
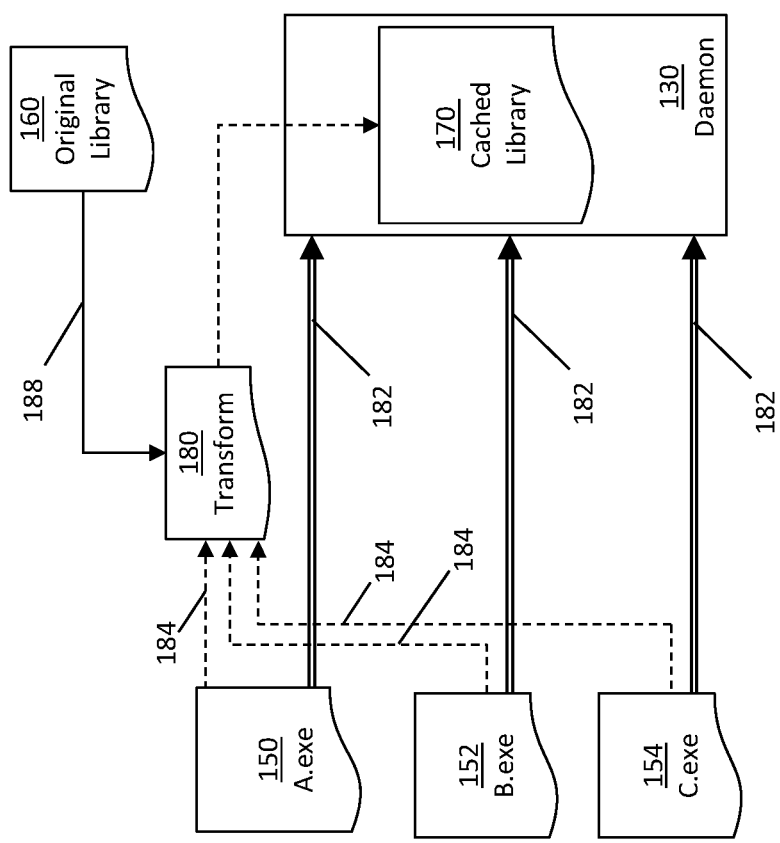
FIG. 2C depicts an overview of a method to minimize memory bloat while providing cybersecurity protection, in accordance with an embodiment of the present disclosure.

Using a shared library reduces memory consumption because it enables multiple executable programs to access a single copy of the library loaded into memory; thus, allowing a library to be shared by multiple executable programs provides reusability of computer code. FIGS. 2A, 2B, and 2C respectively are example use-cases associated with a library shared by multiple executable programs. Specifically, FIGS. 2A, 2B, and 2C depict cases of sharing an original library without transformation, providing individually transformed copies of the original library to executable programs without sharing, and a memory-efficient technique of providing a single cached copy of an original library that has been transformed. Common to FIGS. 2A, 2B, and 2C are the executable programs A.exe 150, B.exe 152, and C.exe 154, and an original library 160.

Referring now to FIG. 2A, a first use-case associated with a library shared by multiple executable programs is shown. For example, the original library 160 exists in memory and is intended to be shared by multiple executable programs. FIG. 2A shows a scenario where there is no binary transformation. The original library 160 may be loaded into memory along with an executable program that was dynamically linked to the library, or it may have been preloaded into memory. If the original library 160 was not preloaded, then the original library 160 is loaded when the first program, A.exe 150, is loaded and identifies the need for the original library 160. Additionally, when the original library 160 is loaded into memory prior to execution, a dynamic link 182 is established between A.exe 150 and the original library 160. Subsequently, when B.exe 152 is loaded and identifies the need for the original library 160, the computer/computing environment is aware that the original library 160 is already loaded into memory and therefore only needs to establish the dynamic link 182 between B.exe 152 and the original library 160. Similarly, when C.exe 154 is loaded, the executable program C.exe identifies the need for the original library 160, and a dynamic link 182 is established between C.exe 154 and the original library 160. Each of executable programs 150, 152, 154 are connected to a single copy of the original library 160 by an associated dynamic link 182. Because a single copy of the library 160 is used for each executable program, this poses a high security risk. A malicious attacker can utilize a known exploit of the original library 160 to gain access to one or more of executable programs A.exe, B.exe, C.exe, causing security breaches of the executable program(s).

To reduce the security risk of having a single copy of the original library 160 accessible by multiple executable programs, FIG. 2B shows a hypothetical scenario where the original library 160 undergoes a binary transformation (e.g., using a transform function 180 residing within a function randomization library in the memory). The purpose of a transform 180 is to create a transformed version of the original library 160 whose structure/arrangement in memory is unknown and which is functionally equivalent to the original library 160. Because the transformed library includes randomly reorganized machine code blocks, it is highly unlikely that a malicious hacker can gain control of the computer system using the transformed library during a cyberattack. Because the transformed libraries are unique, they cannot be shared; hence, each of executable programs A.exe, B.exe, C.exe have their own/dedicated transformed copies of the original library. This arrangement reduces the cybersecurity risk by using a transformed library; however, it increases the memory usage by having multiple copies of the original library.

As shown in FIG. 2B, following a request for a binary transformation 184 of the original library 160, each executable program is connected to individually transformed copies of the original library 160 via associated dynamic links 182. For example, A.exe, B.exe, C.exe are connected to X.lib, Y.lib, Z.lib, where X.lib, Y.lib, Z.lib are respective transformed copies of the original library 160. The first program, A.exe 150, is loaded into memory along with the original library and the function randomization library that includes the transform 180. Immediately upon execution of A.exe, a call 184 is made to the transform 180. As a result, the transform 180 reads the content of the original library 160 (via the incoming path 188) and commences with the creation a new transformed library X.lib 162. Finally, the transform 180 updates the dynamic link 182 to connect A.exe 150 to X.lib 162 replacing the connection between A.exe and the original library 160. This process is repeated for the remaining executable programs, resulting in B.exe 152 being dynamically linked 182 to Y.lib 164, and C.exe 154 being dynamically linked 182 to Z.lib 166. Additionally, the transform 180 re-maps any calls to the original library (e.g., made by functions within an executable program) to point to the respective transformed library. Thus, calls to the original library 160 by functions within A.exe are re-mapped appropriately to X.lib. Similarly, calls to the original library 160 by functions within B.exe and C.exe are re-mapped appropriately to respective transformed libraries X.lib and Y.lib.

In some embodiments, the original library 160 is released from memory. In some embodiments, the original library 160 remains in memory. One disadvantage to this method of transforming shared libraries is increased computing resources are needed to repeatedly perform the transformation. That is, the transformation operation is repeated twice, resulting in less effective utilization of computing resources. Furthermore, because each library, X.lib, Y.lib, Z.lib, is unique, X.lib, Y.lib, Z.lib cannot be shared between multiple executable programs. This can result in poor memory utilization or memory bloat. As additional executable programs using the transformation are loaded into memory, the memory bloat problem exacerbates even more. Embodiments of the present technology are directed at overcoming the memory bloat problems while providing cybersecurity protection.

FIG. 2C depicts an overview of a method to minimize memory bloat which at the same time minimizes cybersecurity risk. In some embodiments, to reduce memory bloat, a daemon 130 (unobtrusively running in the background) is configured to manage sharing the contents of a transformed copy of the original library 160 among two or more executable programs. The daemon 130 is preferably started before the executable programs are loaded in to the computer system's memory for execution. Executable program A.exe 150 is loaded along with its dynamically linked libraries, for example, the original library 160 and the function randomization library which includes the transform 180. Upon a call 184 for a transformation by an executable program (such as A.exe), the transform 180 takes the original library 160 (via incoming path 188), completes the transform 180, and then stores the resulting transformed library within a file created by the daemon 130 as a cached library 170. The transformation also performs the steps to connect A.exe 150 and the cached library 170. Additionally, the transform 180 re-maps functions within A.exe to their corresponding positions/locations within the cached library 170. In some embodiments, the daemon also maintains a record indicating that a transformation of the original library 160 exists within the daemon as the cached library 170. The memory occupied by original library 160 is released following updating of the dynamic link 182 (to point to cached library 170 instead of original library 160) and re-mapping of function calls within A.exe from their positions/locations within the original library to their corresponding positions/locations within the cached library 170.

The cached library 170 residing within the daemon 130 is available for sharing by executable programs B.exe and C.exe. For example, executable program B.exe 152 is loaded subsequent to A.exe 150 that resulted in creation of the cached library 170. Executable program B.exe is loaded along with its dynamically linked libraries, for example, the original library 160 and the function randomization library which includes the transform 180. Upon execution, B.exe calls the transform 180. In this case, prior to performing a binary transformation, the transform 180 first queries the daemon 130 to inquire the existence of a cached copy 170 of the original library 160. In response, the daemon 130 detects that the cached library 170 is available within the daemon 130. Further, the daemon 130 provides an appropriate response to the transform 180 along with the file descriptor of the cached library 170. Using information included within the cached library 170, the transform 180 takes the steps to connect B.exe and the cached library 170, and additionally, re-maps function calls within B.exe from their positions/locations within the original library to their corresponding reorganized positions/locations within the cached library 170. A set of steps similar to those discussed for B.exe is undertaken with respect to sharing the cached library 170 by the executable program C.exe 154.

FIGS. 3A-3C show conceptual block diagrams at various stages of creating a cached library from an original library, in accordance with an embodiment of the present disclosure. The top-level components shown in FIG. 3A include executable program 242, transformation library 250, and original library 228. FIG. 3A shows a first stage 220 when the components reside on a storage medium (e.g., hard drive, network, cloud storage, flash drive, etc.). FIG. 3B shows a second stage 222 when the components along with a daemon 231 are loaded into virtual memory, prior to applying a transformation of the original library 228. FIG. 3C shows a third stage 223 after the executable program 242 requests a transformation of the original library 228 and the resulting cached library 260 is stored inside the daemon 231. In the second and third stages, the components, and the daemon 231 are shown residing in virtual memory. There are two distinct events that occur as a program moves from a storage medium into virtual memory and the point at which the computer begin executing the program. The first event is shown as Load-Time 224 where the program, transformation library, and original library are taken from the storage medium 220 and loaded into virtual memory 222, for example, by a loader. The second event, Run-Time 226, takes place after the program and associated libraries are loaded into memory and execution of the application code 234 of the executable program 242 begins.

The executable program 242 includes executable and linkable format (ELF) headers 233 and application code 234. The ELF header 233 in the executable program 242 provides (among other things) information used by the operating system during loading to allocate memory, identify library dependencies, and identify functions (functional blocks) referenced and residing in either the executable program 242 or any linked libraries. The application code 234, for example, is machine code that provides application functionalities (such as word processing, database management, etc.). The executable program 242 has been pre-configured to support a transformation of an original library 228. Both the transformation library 250 and the original library 228 are dynamically linked to the executable program 242 and shown as residing on the storage medium.

The transformation library 250 (including the randomize function 252) is called immediately after the run-time event and prior to executing any non-security related functions of the application code (splash screens, word processing, database management, etc.). The randomize function 252 provides an entry point for conditionally performing various tasks based on whether a cached library exists or not. For example, if a transformed library (a/k/a cached library 260) does not already exist, the transformation library 250 communicates with the daemon 231 for the purposes of creating the cached library 260 and mapping the cached library to the executable program 242. Creating a cached library can include generating a random reorganization of functions residing in the original library. In cases where the cached library 260 already exists, the randomize function 252 communicates with the daemon 231 to retrieve the information necessary to map the executable program 242 to the existing cached library 260. Other conditional factors related to security may include enabling or disabling the sharing of transformed libraries, managing security settings, etc.

The original library 228 shown in FIG. 3A is the target of the transformation. For example, the original library 228 includes the three functions named Function 1, Function 2, and Function 3 (236, 238, 240) and the relocation data 235. In comparing FIG. 3A and FIG. 3B, it is noted that without a transformation, Function 1, Function 2, and Function 3 (236, 238, 240) are stored in memory in a predictable and sequential order, in the same arrangement as they were stored on the storage medium.

The relocation data 235 in the original library 228 is data described as a static arrangement of the blocks of source code (e.g., arrangement of Function 1, Function 2, Function 3 individually and with respect to one another) and their associated relevant details used for a transformation. For example, with respect to original library 228, the relocation data 242 can provide information about the library structure, function memory requirements, nested variables referenced which may move during restructuring, and other layout information for use during transformation/randomization. The relocation data 242 can be created and appended to the original library 242 by a linker at an earlier stage of program development as part of building the library program (i.e., compiling and linking) The relocation data 242 can describe a static structure of Function 1, Function 2, Function 3 (denoted 236, 238, 240 respectively) in the original library 242.

In systems that are not protected by transformations, the original library may be reverse-engineered to discover vulnerabilities in the machine code which appear in a predictable fashion when loaded into memory, thereby enabling a cyberattack. The benefit of the transformation of an original library is two-fold. First the transformation will rearrange the order of the functions in memory, such that any prior knowledge of the predictable arrangement from loading is of no aid to the hacker. Second, the transformed library will be stored into the daemon 231 as a cached library 260 with provisions to enable other executable programs to share and utilize the cached library, thereby providing security while not increasing memory consumption by requiring multiple transformed libraries to be loaded into memory.

At a load-time event 224, prior to transformation, the information from the ELF headers 233 is used (e.g., by a loader) to allocate space in virtual memory for the executable program 242 and establish the dynamic links for the transformation library 250 and original library 228. For example, once the executable program 242, the transformation library 250, and the original library 228 are loaded into virtual memory, the loader performs the task of creating linkage section 243 and client metadata section 244 within the memory occupied by the executable program 242. The linkage section 243 establishes a connection between the executable program 242 and the original library 228 based on a file descriptor of the original library 228. A file descriptor is a unique identifier that identifies libraries and/or binaries within the file system of a computing environment. For example, if the executable program 242 accesses functions included within two original libraries L1 and L2, then the linkage section 243 connects the executable program 242 to L1 and L2 using respective file descriptors FD1 and FD2, where FD1 and FD2 denote the file descriptors assigned to L1 and L2 by the kernel. The client metadata section 244 establishes connections to individual functions included within an original library 228. For example, with respect to FIG. 3A, the client metadata section 244 establishes connections to Function 1 (denoted 236), Function 2 (denoted 238) and Function 3 (denoted 240) of original library 228. Thus, the client metadata 244 is uniquely related to the memory locations where portions of the machine code corresponding to Function 1, Function 2, Function 3 reside. In some embodiments, the linkage 243 and the client metadata 244 are collectively termed as a writeable section of the memory occupied by the executable program 242. The linkage 243 and client metadata 244 are writable sections in memory occupied by the executable file.

FIG. 3B shows daemon 231 existing in memory. It is common for daemon 231 to be loaded into the computer on start-up. However, it may be also be loaded prior to the load-time event 224. The daemon exists in the user space waiting to be called by the randomize function 252. Subsequent to creation of a cached library, a daemon (such as daemon 231) stores and manages sharing of the cached library.

At run-time event 226 (defined as an event preceding execution of the application code 234 of the executable program), the executable program 242 requests a transformation of the original library 228. More specifically, the executable program 242 calls the randomize function 252 from the transformation library 250 to be applied to the original library 228. In response to this request, the original library 228 is subjected to a transformation (e.g., a random modification or a randomization event) and the resulting library is stored in the daemon 231 as the cached library 260. The cached library 260 is functionally equivalent to the original library 228, but the blocks of code corresponding to Function 1, Function 2, Function 3 of original library 228 are randomly reorganized within cached library 260. This random reorganization is shown by the arrows linking the functions of the original library 228 before randomization in FIG. 3B to the functions of the cached library 260 after randomization in FIG. 3C. As a result of the transformation, the order and memory locations (e.g., memory addresses) of Function 1, Function 2, Function 3 have been muddled or obfuscated. Thus, any prior knowledge of the library structure is no longer valid. For example, the randomize function 252 can include one or more algorithms that use a randomization seed to generate a random (or, pseudorandom) sequence of numbers. The generated random (or, pseudorandom) sequence of numbers can be used to determine the order of Function 1, Function 2, Function 3 in the cached library 260.

The transformation is a coordinated event between the transformation library 250 and the daemon 231. For example, the daemon 231 is responsible for opening and closing the in-memory file which stores the cached library 260, and the transformation library 250 randomizes and builds the contents within the cached library 260. FIG. 3C shows that the relocation data 235 (that existed in the original library 228 describing the functions and the layout of the original library 228) is appended to the cached library 260. In some embodiments, the randomize function 252 takes (as inputs) the relocation data 235 and the memory addresses of functional blocks (e.g., Function 1, Function 2, Function 3) within the original library 228 for generating the randomly reorganized layout of the functional blocks (e.g., Function 1, Function 2, Function 3) within the cached library 260. Generating the randomly reorganized layout can include making appropriate corrections within machine code portions. Examples of corrections can include adding data address offsets and/or changing the branch address(es). In addition to generating the randomly reorganized layout of Function 1, Function 2, Function 3, the randomize function 252 also generates library metadata 245 describing memory addresses of the randomly reorganized machine code portions corresponding to respective functional blocks of the original library. For example, the library metadata 245 can uniquely identify the specific memory locations (e.g., within the cached library 260) where Function 1, Function 2, Function 3 reside. The library metadata 245 is used to map calls from the executable program 242 to the randomly reorganized memory layout of machine code corresponding to Function 1, Function 2, Function 3. Before closing a file storing the cached library 260, the library metadata 245 is also appended to the cached library 260.

Having created the cached library 260, the randomize function 252 also updates the linkage section 243 and client metadata section 244 of the executable program 242, thereby enabling the executable program 242 to access Function 1, Function 2, Function 3 within the cached library 260. The linkage section 243 is specifically updated with the file descriptor assigned to the cached library 260. Generally, the file descriptor of the file storing cached library 260 is assigned by the kernel. Upon updating the linkage section 243, the operating system may release the physical memory space previously occupied by the original library 228, and as a result the client module 229 no longer includes the original library 228. It is noted that prior to the run-time event 226, the original library 228 resided within the memory space of the client module 229. According to disclosed embodiments, the transformation library 250 additionally updates the client metadata section 244 (which previously included mappings to Function 1, Function 2, and Function 3 of the original library 228) according to the library metadata 245 (which points to Function 1, Function 2, and Function 3 of the cached library 260). As a result, calls to Function 1, Function 2, Function 3 are properly reconnected following the randomization event. Thus, as shown in FIG. 3C, the cached library 260 (which resides and is managed by a daemon 231) includes randomly reorganized portions of machine code corresponding to Function 1, Function 2, Function 3 of the original library 228, the relocation data describing a static structure of Function 1, Function 2, Function 3 in original library 228, and the library metadata 245 (also termed as library-specific metadata) describes the specific memory locations where Function 1, Function 2, Function 3 reside in the cached library 260.

Although FIG. 3C illustrates library metadata 245 included as part of the cached library 260, in alternate embodiments, the library metadata 245 residing in the daemon 231 may not be included as part of the cached library 260, but rather stored within the memory of the daemon 231.

Figure 4C:
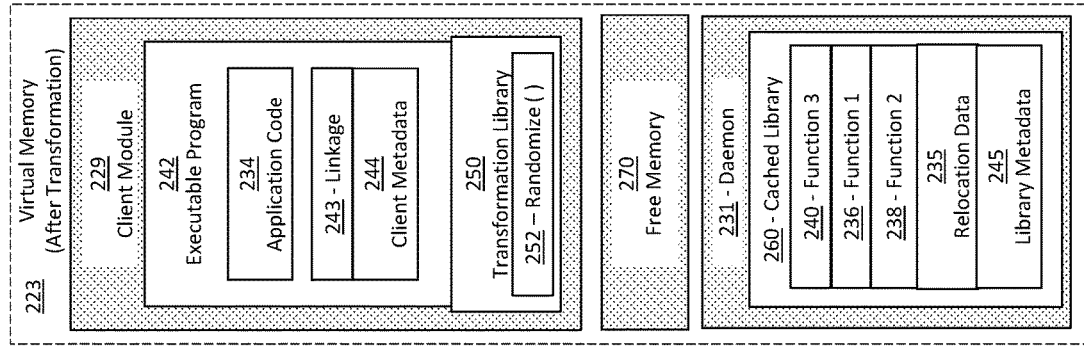
FIGS. 4A-4C show conceptual block diagrams at various stages of enabling access to a cached library, in accordance with an embodiment of the present disclosure.
Figure 4B:
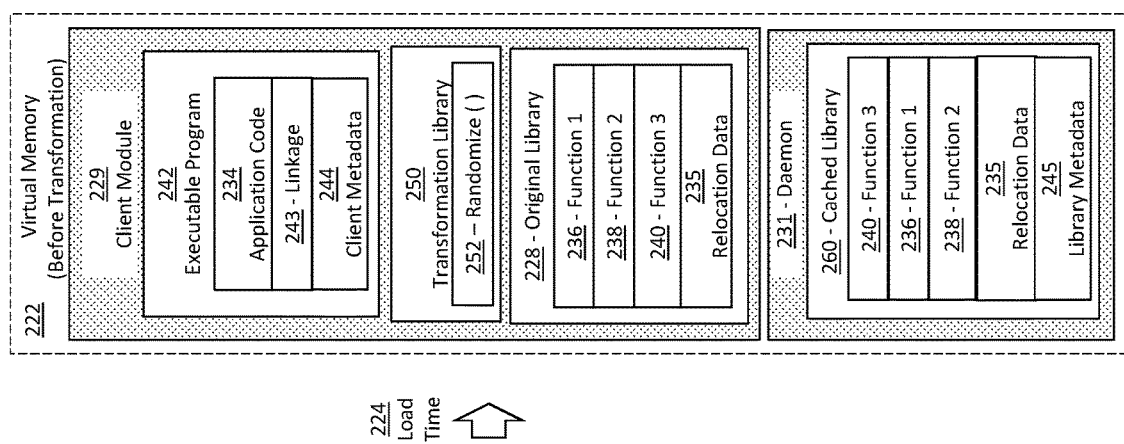
Figure 4A:
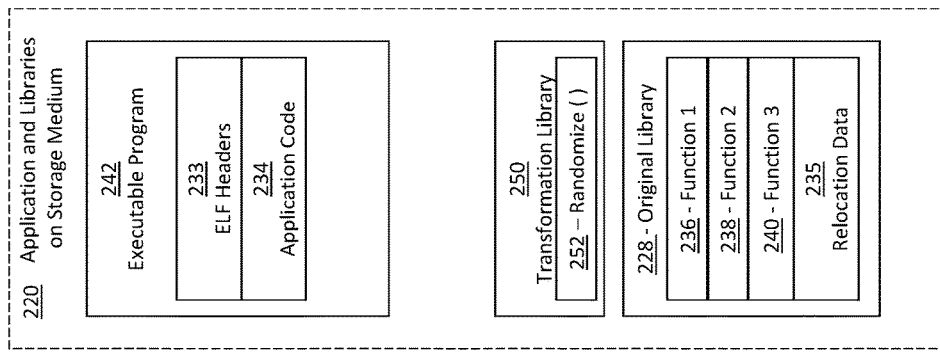

FIGS. 4A-4C show conceptual memory block diagrams at various stages of enabling access to a cached library, in accordance with an embodiment of the present disclosure. Specifically, FIGS. 4B and 4C show that a transformed copy of the original library exists in the daemon as a cached library 260. Elements appearing in FIGS. 4A, 4B, and 4C and defined previously are identical in functionality as stated in the earlier descriptions of FIGS. 3A, 3B, and 3C. FIG. 4A shows a first stage 220 when the components reside on a storage medium (e.g., hard drive, network, cloud storage, flash drive, etc.). FIG. 4B shows a second stage 222 when the executable program 242, the transformation library 250, and the original library 228 reside in memory along with a daemon 231 storing the cached library 260. The cached library 260 is functionally equivalent to the original library 228. FIG. 4C shows a third stage 223 (following the run-time event 226) when the transformation library 250 provides the executable program 242 with the cached library 260 residing in the daemon 231, in response to the executable program 242 requesting a transformation of the original library 228.

FIG. 4A is similar to FIG. 3A. The top-level components shown in FIG. 4A include executable program 242, transformation library 250, and original library 228 residing on a storage medium (e.g., hard drive). Both the transformation library 250 and the original library 228 are dynamically linked to the executable program 242.

At a load-time event 224, the executable program 242, the transformation library 250, and the original library 228 are loaded into memory, even though the cached library 260 exists in the memory. For example, FIG. 4B shows the daemon 231 including cached library 260 which is a transformed copy of the original library 228.

At run-time event 226 (defined as an event during execution of the program), the executable process 242 requests a transformation of the original library 228. More specifically, the executable process 242 calls the randomize function 252 from the transformation library 250 to be applied to the original library 228. This time, however, the randomize function queries the daemon 231 to see if a transformed version of the original library exists as a cached library 260, upon which the daemon 231 acknowledges that the cached library 260 does exist and sends (to the transformation library 250) the file descriptor of a file storing the cached library 260. The transformation library 250 uses the file descriptor to identify and read the contents of the cached library 260. For example, the transformation library reads the relocation data 235 and the library metadata 245. Using the file descriptor, the randomize function 252 updates the linkage section 243, and, as a result, the client module 229 (which includes the executable program 242 and the transformation library 250) is enabled to access the cached library 260, when the executable program 242 attempts to access the original library 228. According to disclosed embodiments, the transformation library 250 additionally updates the client metadata 244 (which previously included mappings to Function 1, Function 2, and Function 3 of the original library 228) according to the library metadata 245 which includes memory specific mappings to Function 1, Function 2, and Function 3 of the cached library 260.

As a result, calls to Function 1, Function 2, Function 3 are properly reconnected following the randomization event. It is noted that FIGS. 3B and 3C show that the cached library 260 (which resides and is managed by a daemon 231) includes randomly reorganized portions of machine code corresponding to Function 1, Function 2, Function 3 of the original library 228; the relocation data describes a static structure of Function 1, Function 2, Function 3 in original library 228; and the library metadata 245 (also termed as library-specific metadata) describes the specific memory locations where Function 1, Function 2, Function 3 reside in the cached library 260.

Although FIGS. 4B and 4C illustrate library metadata 245 included as part of the cached library 260, in alternate embodiments, the library metadata 245 residing in the daemon 231 may not be included as part of the cached library 260.

In some scenarios, the original library and the cached library can correspond to different versions of the same software but can be generally compatible with each other. For example, the original library can be a version 1.0 and the cached library can be a version 1.2. Or alternately, the object file for the original library and the transformed library may be created from identical source code but compiled on different compilers or using different compiler options (such as memory optimization). In both cases, the versions of the original library and the cached library may not necessarily be identical at a binary level. It is possible, based on path settings or user pre-loaded libraries, that a program may reference a different version of the library than what is residing in the daemon—although both may adequately support the function necessary for the executable program. The relocation data residing in the original library relates to the exact version of the original version of the library (and not a subsequent or a revised version). According to the disclosed technology, if an executable program requests a transformation of an original library (e.g., having a version 1.0), then the transformation library provides the cached library (e.g., having a version 1.2) to the executable program. The transformation library updates the linkage section and the client metadata section using the file descriptor and the library metadata relating to the cached library. As a result, calls to Function 1, Function 2, Function 3 of the original library (e.g., version 1.0) are properly reconnected to the cached library (e.g., version 1.2).

Figure 5:
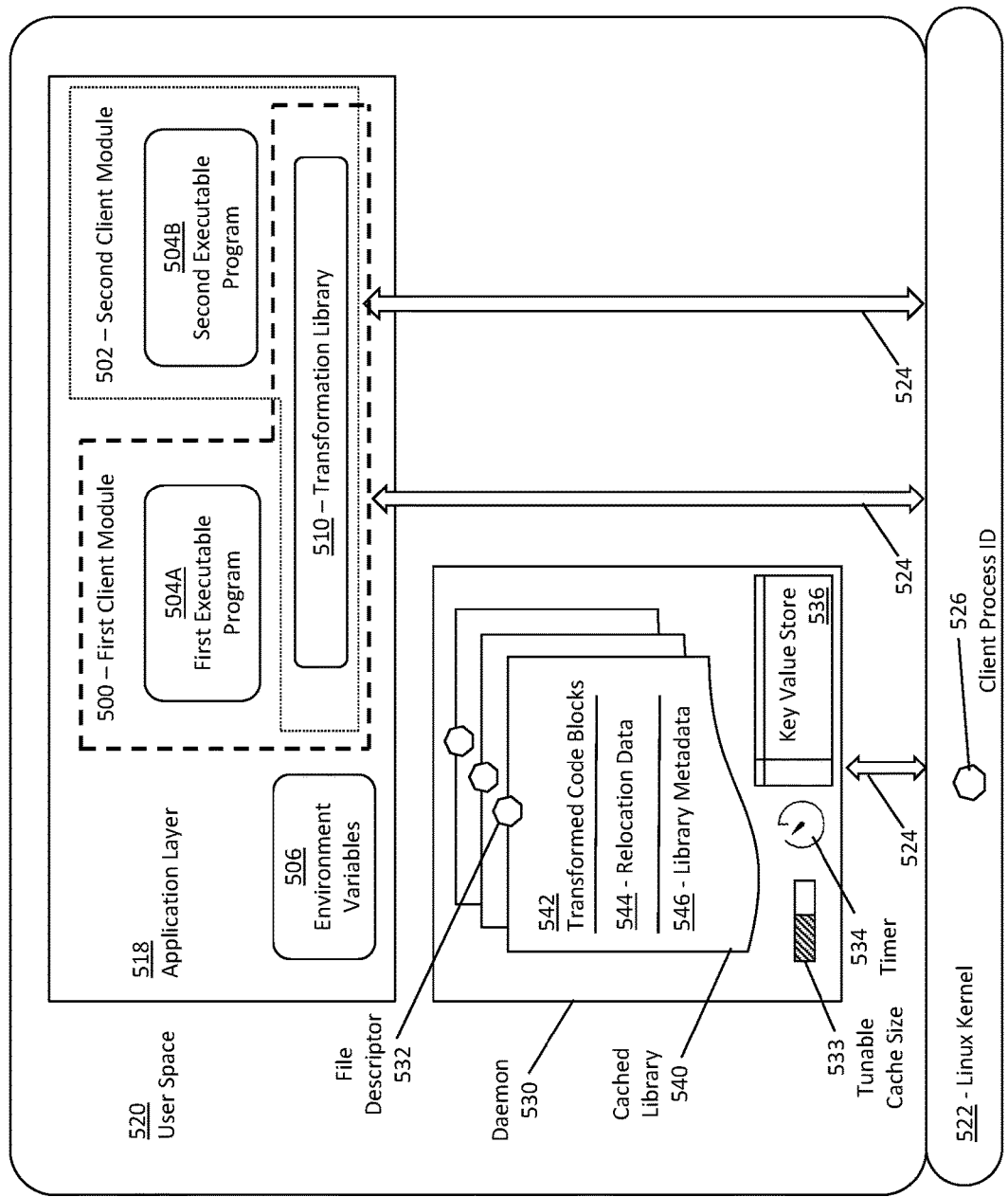
FIG. 5 shows an example layout of different components of the system within a computing environment, in accordance with an embodiment of the present disclosure.

FIG. 5 shows the in-memory system architecture of components after a binary transformation occurs and outlines the communication scheme between the two client modules 500 and 502, the daemon 530, and the Linux® kernel 522. At the base of the architecture, the Linux® kernel 522 assigns and maintains the client process user ID or UID 526. Above the Linux® kernel 522 is the user space 520 where the daemon 530 resides as part of the low-level system components. As shown in FIG. 5, indirect communication channels 524 can be used for communications between the transformation library 510 and the daemon 530, with communications occurring via the Linux® kernel 522. Many different inter-process communication primitives can be used depending on the operating system. One example of a communication channel 524 can be a UNIX socket for a Linux® kernel 522.

The first client module 500 and second client module 502 reside in the application layer 518. References where the context is relevant to a single generic client module shall be indicated simply by client module 500. References where the context pertains to the existence of multiple client modules are denoted by a first client module 500 and a second client module 502. Speaking to specific computer terms, a client module 500 may also be referred to as a process or a client process. The client module 500 includes an executable program 504A, a binary identifier assigned by the kernel, and has associated system permission levels that are maintained by the Linux® kernel 522. The client module 502 includes an executable program 504B, a binary identifier assigned by the kernel, and has associated system permission levels that are maintained by the Linux® kernel 522. The transformation library 510 is included as a part of both the first client module 500 (as indicated by heavy dashed lines) and as a part of the second client module 504 (as indicated by dotted lines). Further, executable programs 504A, 504B may or may not be instances of the same program. Client modules 500 and 502 can pass information to one another using flags, configuration files, system settings, hard-coded rules, etc. Further, any of these methods may implement security policies.

The transformation library 510 includes a subroutine called Randomize ( ), which is an entry point to facilitate the use of a random reorganization of an original library. FIG. 5 illustrates an arrangement in which the first client module 500 has been loaded into the system and places a cached library 540 into daemon 530 after a call to randomly reorganize the original library. Subsequently, the second client module 502 (calling the same original library) requests for a random reorganization of the original library. As a result, after the call to Randomize ( ) from each executable program, both client modules 500 and 502 are dynamically linked to the cached library 540 residing in the daemon 530.

In some embodiments a flag may be used by the transformation library 510 to enable or disable caching of libraries. As an example, an environmental variable 506 can be used to pass this flag between client modules in the user space 520 and the transformation library 510. This flag can be a Boolean (e.g., enable or clear) variable. Alternately, a flag can be a variable capable of passing a wider range of enumerated values. When library caching is set or enabled, a single copy of a cached library 540 may be shared between the first client module 500 and second client module 502, thus efficiently utilizing memory resources. The effect of clearing or disabling the flag for sharing restructured libraries is that the first client module 160 will have its own copy of a transformed library, and the second client module 502 will have its own copy of a transformed library—and these libraries may be stored locally as part of the client module 500 or registered and stored in the daemon 530. The advantage to disabling library caching is increased security as the second client module 502 has no knowledge of the library structure of the first client module 500. The disadvantage to disabling library caching, of course, is the additional memory resources required to create multiple randomized libraries.

The transformation library 510 includes application-agnostic functions which perform several tasks such as randomly reordering machine code portions of an original library to generate a cached library, patching library metadata into writable sections of executable program 504A (or, 504B) to utilize the cached library, allowing (as an intermediary) communication between the client module 500 and the daemon 530, etc.

Below the application layer 518 is the daemon 530. The daemon 530 is primarily responsible for storing the cached libraries 540 and a key value store database 536. The cached library 540 includes all functions previously available from an original source library prior to randomization After randomization, the functions (alternatively termed as post-transformation functions) are shown as transformed code blocks 542. According to disclosed embodiments, transformed code blocks 542 are essentially machine code portions randomly reordered in memory. In addition to the transformed code blocks 542, each cached library 540 includes relocation data 544, which was created during the program build, and library metadata 546, which describes how the library exists in memory. Both the relocation data 544 and the library metadata 546 are used to connect the client module 500 (and/or client module 502) to the cached library 540. The daemon 530 also contains a cache entry for each cached library 540 that includes a file descriptor 532. File descriptor 532 is used to identify the cached library using the computer's file system management and is also used to update the dynamic link between the executable program 504A (and/or executable program 504B) and the cached library.

The key value store 536 provides a cross-reference between a binary identifier (which provides reference to the library required by the executable program 504A and/or executable program 504B) and the file descriptor 532 for the associated cached library 540. The key value store 536 is utilized when a transformation is initiated and the transformation library 510 queries the daemon 530 to determine if a cached library 540 corresponding to the original library required by the client module 500 exists in the daemon 530.

The relocation data 544 is used to map or connect the functions of the cached library 546 to the client module 500 (and/or client module 502), and the library metadata 546 includes additional writable fixup metadata required to properly connect the cached library 540 to the client module 500. In some embodiments, other metadata which may be stored in the daemon 530 and associated with the cached library 540 include information relevant to enforcing security policies.

To control the resource usage of the daemon 530, the daemon may employ several strategies to unload or release cached libraries 540 from system memory. One strategy shown in FIG. 5 is a tunable cache size 533, which may be specified in memory size or as a maximum number of cached libraries 540. Utilizing the tunable cache size 533, the daemon 530 can evict randomized cached libraries 540 from the daemon using a least recently used (LRU) strategy upon reaching the maximum number of cached libraries threshold, so that frequently used libraries stay in the daemon—as long as space is available. Another strategy is to close the file descriptor 532 when the last client module 500 linked to the transformed cache library 540 exits or unloads the library, thereby allowing the kernel 522 to release the memory. Yet another strategy is to track which client modules 500 are mapped (using their client process ID 526) to their respective cached libraries, polling when all client modules 500 using a cached library 540 have exited or unmapped the cached library 540, and closing the file descriptor 532 of the cached library 540 following this event. Another strategy may be used whereby the administrator simply restarts the daemon 530 to clear the cache and forces all future client modules 500 to create a new transformed cache library 540. Another strategy may exist where a configuration file specifies which libraries to cache, such as a white-list or black-list of libraries. The configuration file in this strategy may be statically set on a mass deployment build, or dynamically set, which could be updated remotely from another system or based on usage on the host.

Residing in the Linux® kernel 522 is the client process ID (denoted 526) of the client module 500 along with the associated permission levels. The client process ID 526 is used by the daemon 130 to determine if the client module 500 has sufficient permissions to either create a transformed version or access a given library in the daemon. The query to the Linux® kernel 522 may be accomplished by various methods. One method available on a Linux® operating system is querying SO_PEERCRED to get the credentials of the Client Module 500 communicating via a socket connection to the daemon 530. Client module 502 will also have an associated client process ID in the Linux® kernel 522.

Figure 6:
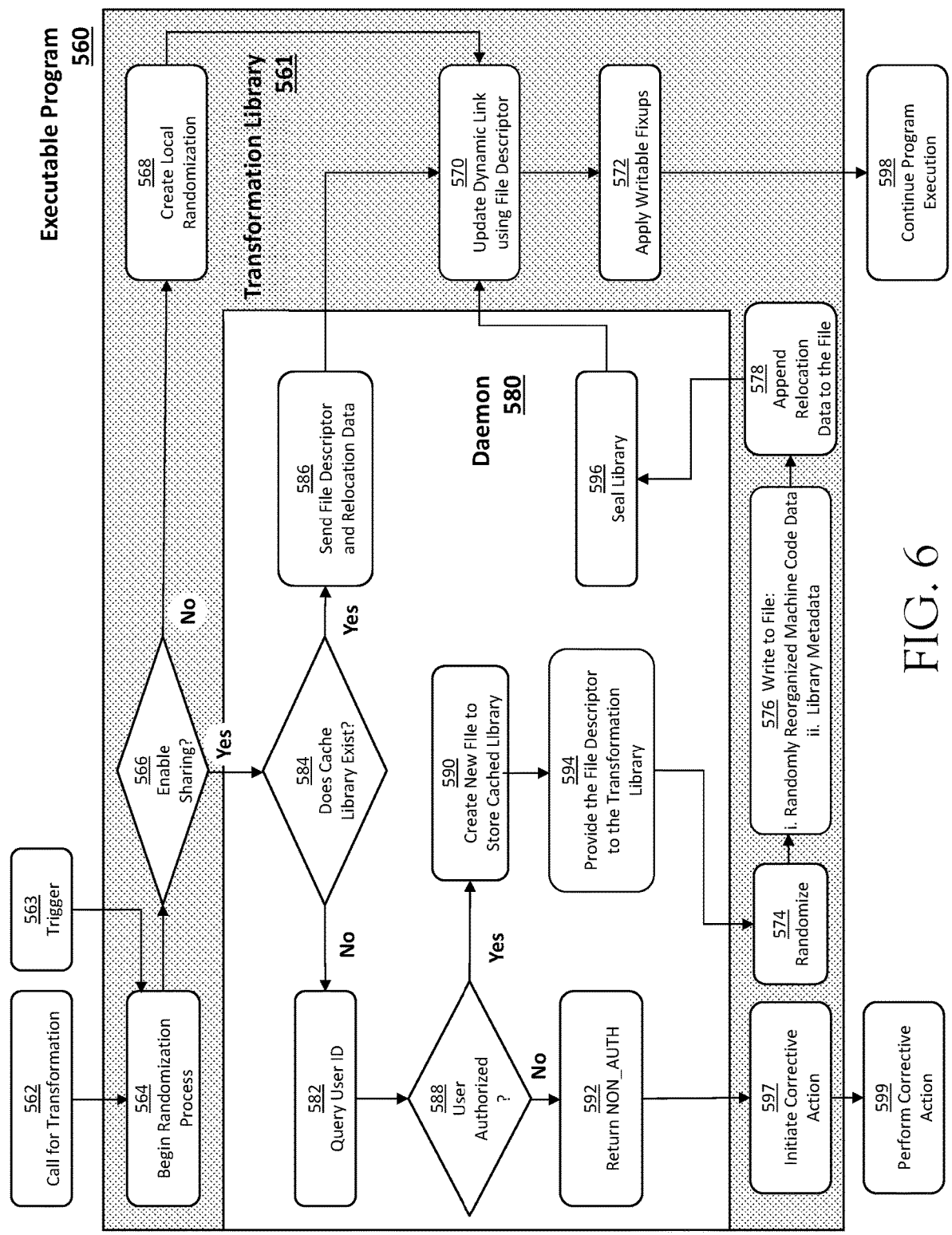
FIG. 6 depicts a flow diagram for library management and messaging between different components of the system, in accordance with an embodiment of the present disclosure.

FIG. 6 depicts a flow diagram for library management and messaging between the executable program 560, the transformation library 561, and the daemon 580. Also represented are the boundaries between the executable program 560, transformation library 561, and daemon 580 to illustrate where the individual steps take place across the system. The transformation library 561 and the executable program 560, collectively referred to herein as the client module, are treated as a client to the daemon 580. The flow diagram typically starts with the execution of the executable program 560 calling (step 562) for the transformation and ends with the executable program seamlessly continuing (step 598) normal operation subsequent to either successful creation of a cached library based on a restructuring of the original library or enabling the sharing of an existing cached library.

The Call for Transformation block 562 is where the executable program begins its execution directly after the loader finishes. In some embodiments, the call for library randomization can happen immediately upon execution. In embodiments where the call for library randomization does not happen immediately, the executable program may create function pointers on the stack, on the heap, and in the global section that will need updating to reflect the code layout post-randomization. The flow diagram continues to Begin Randomization process 564 of the transformation library 561, which is the entry point for creating and/or using a randomized cached library. The flow diagram continues to the decision block Enable Sharing 566. The Enable Sharing block 566 may exist to enable or disable caching of a randomized original library. In one embodiment, an environment variable or other flag may be used to enable or disable this setting. If the environment variable is set, the process continues to Does Cache Library Exist 584. If the environment variable is clear, then the transformation library process will locally create a randomized version of the original library for each client module during the Create Local Randomization block 568. Thus, the transformation library 561 will not cache or share the specific randomized library requested by the executable program 560 with other programs on the system. This decreases efficiency of utilization of memory resources but increases the security because each client module has exclusive access to its own randomized version of the original library.

If library sharing is enabled, the Does Cache Library Exist block 584 in the transformation library 561 queries the daemon 580 regarding the existence of a cached copy of the original library. This is accomplished by passing a binary identifier of a library corresponding to the original library requested by the executable program 560. The daemon uses the key value store to determine if the cached copy of the original library is currently stored in the daemon's cache. If a cached copy of the original library resides in the daemon, the flow continues to Send File Descriptor and Relocation Data 586. Otherwise, if a cached copy of the required library does not reside in the daemon, the flow continues to the Query User ID block 582 where the daemon queries for the credentials of the executable program from the kernel (e.g., the Linux® kernel). After the kernel responds with the User ID associated with the executable program, the permission level of the client module is checked by the daemon against a pre-determined value. In some embodiments, the permission level of the client module can be set beforehand by a system administrator to ascertain if a client module has sufficient authorization to create a cached library. If the daemon determines that the client module has permission (User Authorized block 588) to create a cached library, the flow proceeds to the Create New File to Store Cached Library block 590. If the user does not have permission to create a restructured library, the flow proceeds to the Return NON_AUTH block 592.

If the daemon 580 determines (block 588) based on the user ID associated with the executable program requesting creation of a new cached library has sufficient privileges, the daemon performs two tasks. First, the daemon creates a new in-memory file to store or cache the restructured library in the block 590. The in-memory file is like a container for the cached library that will be created, and a file descriptor of the file is assigned/generated by the kernel's file system. Secondly, the daemon 580 sends (to the transformation library 561) the file descriptor of the newly created cache file at block 594. Next, the flow continues to the Randomize block 574 in the transformation library 561.

In one embodiment, the Randomize block 574 within the transformation library 561 performs a randomization of the functions or functional blocks of the original library producing a library having a randomly reordered structure. Stated differently, machine code corresponding to the functions is randomly reorganized in memory. In some embodiments, the Randomize block 574 does not cause any randomization and the machine code corresponding to the functions have an identical memory layout as the original library. In case the Randomize block 574 randomly reorders the library structure, then the newly created in-memory file is used to store the re-structured library. In some embodiments, the Randomize block 574 takes (as inputs) the relocation data and the memory addresses of functional blocks within the original library for generating the randomly reorganized layout of the functional blocks within the re-structured library. The relocation data describes a static structure of the functional blocks in the original library and is available during compilation/linking of the executable program. Generating the randomly reorganized layout can include making appropriate corrections within the machine code portions. Examples of corrections can include adding data address offsets and/or changing the branch address(es). In addition to generating the randomly reorganized layout of individual functions, the Randomize block 574 also generates library metadata describing memory addresses of the randomly reorganized machine code portions corresponding to respective functional blocks of the original library. For example, the library metadata can uniquely identify the specific memory locations (e.g., within the restructured library).

After the Randomize block 574, the transformation library 561 continues to the Write to File 576 block. In block 576, the transformation library 561 writes the randomly reordered machine code portions and the library metadata (alternatively termed herein as library-specific metadata) into the in-memory file. The library metadata 245 provides dynamic information describing how the randomly reorganized machine code portions are inter-related with one another in the library structure of the cached library. Further, the transformation library 561 appends (step 578) the relocation data to the in-memory file. For example, the relocation data can be used for modifying certain writable sections in the memory occupied by the original library. Once the cached library is complete with reorganized machine code and relocation data, the transformation library 561 sends a message to the daemon 580 stating that it has finished. Accordingly, the daemon 580 protects the cached library at the Seal Library block 596, where the cached copy of the restructured library is sealed to make the in-memory file read-only. Following the sealing of the cached copy of the restructured library, the transformation library 561 updates (using the file descriptor received in step 594) a dynamic link included in the executable program 560. For example, updating the dynamic link results in the connection to the original library being replaced by the connection to the cached library. At block 572, the transformation library 561 uses the relocation data (appended to the file in block 578) and library-specific metadata to modify the writable data portion in the memory occupied by the executable program. Finally, the transformation library 561 returns to the executable program code as shown in the Continue Program Execution block 598.

Another path which may be taken from the Enable Sharing block 566 is the case where enable sharing is disabled. In this case, the transformation library 561 does not contact the daemon 580, and instead proceeds to the Create Local Randomization block 568. In block 568, the transformation library 561 replaces the existing original library in virtual memory with a randomly restructured library, whose structure is known only to the client module and updates the dynamic link to point to the restructured library (block 570). The path continues to block 572, Apply Writable Fixups, where the transformation library finishes the relocation process by applying fixups to the writable data sections in the memory occupied by the executable program. The fixups are made using library metadata extracted from the randomly reordered library structure created in block

568. Finally, the transformation library returns to the executable program code as shown in the Continue Program Execution block 598.

An alternative path which may be taken from the Does Cache Library Exist block 584 is the case where the cached library (or, binary) exists within the daemon 580. This scenario occurs when a first executable program has already created the cached library, which is available for sharing by other executable programs. From block 584, the flow continues to the Send File Descriptor and Relocation data block 586. At this point, the daemon 580 sends information to the transformation library 561 including the file descriptor of the file storing the cached library and relocation data associated with the cached library. The transformation library 561 uses this information to update a dynamic link (block 570) connecting the executable program and the original library, essentially replacing the existing mapping to the original residing in virtual memory, and continues to block 572. At block 572, Apply Writable Fixups, the transformation library applies fixups (using the relocation data from block 586) to the writable data sections occupied by the client module. Finally, the transformation library returns to the executable program code as shown in the Continue Program Execution block 598.

If the daemon 580 determines (block 588) based on the user ID that the client module requesting creation of a new cached library does not have sufficient privileges, then the flow enters a Return Nonauthor (non-authorization) block 592. In block 592, the daemon 580 returns a value declaring that the client module is not authorized to create a restructured cached copy of the original library based on the comparison done by the daemon in block 588. From block 592, the daemon enters block 597 in the transformation library 561, in which the transformation library 561 initiates corrective action. Examples of corrective action include (1) the transformation library receiving a value (e.g., indicating that the client module is unauthorized to create a cached library) from the daemon, (2) the transformation library 561 randomizing the machine code portions and creating a non-cached copy of the original library, (3) the transformation library returning pertinent non-authorization information to the executable program 560, (4) the transformation library process may track the number of unauthorized client module attempts and contact a remote agency via e-mail, SMS, etc. to assess a possible misconfiguration or user error, and/or (5) the transformation library process may include a method to terminate the process with or without informing the client module process. Accordingly, in some embodiments, the executable program 560 takes (in block 599) corrective action, based on the daemon's initiation. For example, the executable program 560 may terminate with or without warning, continue utilizing the original library, or operate in a restricted capacity.

An additional Trigger block 563 is shown in one embodiment as an entry point from the executable program 560 to force re-randomization during the process. The embodiment involves re-randomization of the cache library after an initial restructuring of the library as there may be conditions wherein it is desirable to repeat the restructuring of the cached library. Examples may include a time-based scenario, such as providing updated libraries every 24 hours, or other conditions arising during the process. As shown, the Trigger block 561 leads into the Begin Randomization Process block 564. In some alternative embodiments, the trigger may connect to alternative points in the flow diagram.

Although not shown in FIG. 6, in some embodiments, an executable program may be subjected to a transformation similar to a transformation of a library. For example, functions or functional blocks in the executable program can be subjected to a randomization at load time. The randomization can be caused by one or more functions defined in a transformation library which is dynamically linked to an ELF header included in the executable program. Aside from the ELF header, the executable program also includes one or more functions and function relocation data describing a static arrangement of the one or more functions of the executable program in memory. As a result of the transformation, machine code portions corresponding to the functions can get randomly reorganized in memory after load time and prior to execution of the executable's primary function.

Figure 7:
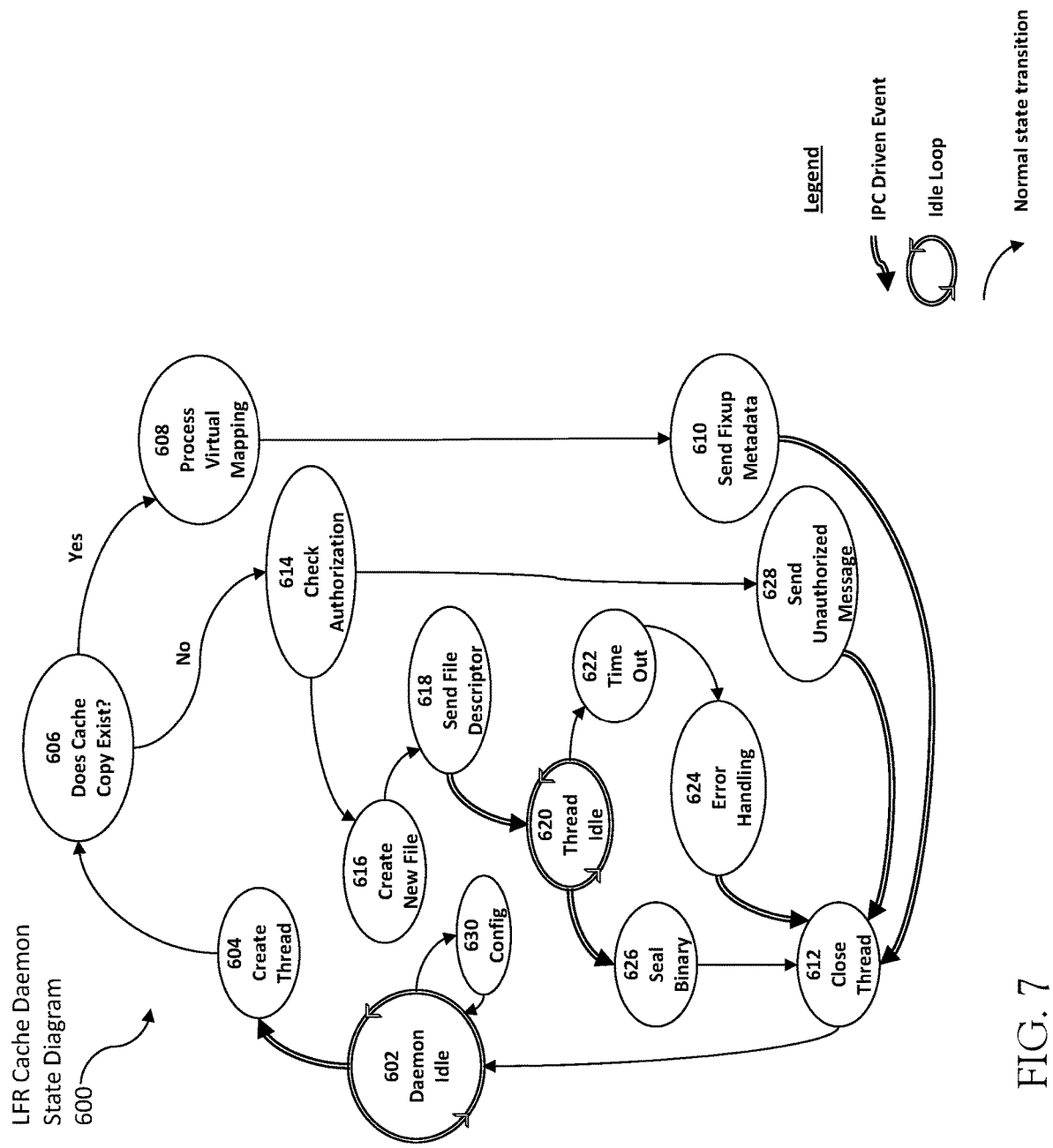
FIG. 7 shows an example state diagram of a daemon, in accordance with an embodiment of the present disclosure.

FIG. 7 shows the state diagram 600 of a daemon (alternatively termed herein as cache daemon or LFR cache daemon) managing access to a cached library. The state diagram in FIG. 7 shows three types of arrows: a normal transition from one state to another, an idle loop, and a transition driven by inter-process communication (IPC). In IPC, the daemon listens for messages on a UNIX socket. The daemon is typically loaded during the system start-up process. In some embodiments, the daemon initially enters the daemon idle state 602. From state 602, the daemon may receive a query for configuration information and enter state 630 and then go back to state 602.

Upon receiving a first message (from a client module), the daemon will create a new thread (state 604). In some embodiments, the LFR cache daemon is capable of operating multiple threads and provides a new thread for each client module. A client module can include a transformation library and an executable program. Each client module is identified by a unique binary identifier also called as a process identifier. From state 604, the new thread proceeds to state 606 in which the daemon determines whether a cached copy exists. State 606 receives the binary identifier which was included in the first message and utilizes the key value store to search a database for the binary identifier.

If the binary identifier is found at state 606 and cross-referenced to a cached copy of the requested library (or, binary) residing in the daemon, the daemon continues to state 608 in which the daemon provides information for the client module to perform a mapping. For example, at state 608, the daemon returns the file descriptor to the client module, which is used by the client module to map the location of the cached copy into the client module's virtual memory. The daemon continues to state 610 in which some embodiments include the daemon providing fixup metadata to the client module. The fixup metadata can be library-specific metadata to re-map a writable section included in the client module's memory location, for enabling the client module to access the randomly reorganized machine code portions in the cached library when the executable program in the client module attempts to access the original library instead of the cached library. From state 610, the daemon enters state 612 in which the thread is closed, and the daemon goes back to the initial idle state 602. It will be appreciated that the above-mentioned states are traversed in a situation when a cached copy of a library is residing within the daemon. The cached copy of the library can, for example, be created by a first executable program included in a first client module. When a second executable program included in a second client module requests access to the library (e.g., an original copy of the library), the cached library residing in the daemon's cache can be shared by the second executable program.

If the binary identifier is not found in the key value store in state 606, the daemon enters state 614, Check Authorization. In state 614, the daemon requests the client module's user ID from the kernel. The kernel responds with the user ID for the client module. The daemon checks this user ID against a pre-set value, which may exist in the daemon configuration, to determine if the client module is authorized to create a new cached library.

If the client module is not authorized to create a new cached library in state 614, the daemon continues to state 628 in which the daemon sends a message indicating that the executable program requesting creation of a new cached library is not authorized to create the new cached binary. Further, the daemon continues to state 612 in which the thread is closed, and the daemon goes back to the initial idle state 602. It will be appreciated that the above-mentioned states are traversed in a situation when the client module is not authorized to create a new cached library.

However, if the client module is authorized to create a new cached library in state 614, the daemon continues to state 616. At state 616, the daemon creates a new file having a file descriptor. In some embodiments, the file is an in-memory file existing in the system RAM, but the file may also reside on other storage media such as a hard-drive, etc. As a result of creating the file, the file descriptor is assigned by the kernel. In some embodiments, the file is left open by the daemon. After creating the new file, the daemon proceeds to state 618, Send File Descriptor. At state 618, a message with the file descriptor is sent from the daemon to the client module. The daemon continues to state 620, Thread Idle.

In some embodiments, a timer can be maintained in the daemon to manage duration of error states, such as a lack of response following opening of a file. This timer may reside in the daemon process thread, or the timer can be managed elsewhere within the daemon. In one embodiment, the timer is managed by the current open thread of the daemon and is set to expire after a pre-configured duration of entering the idle state 620. If the timer expires, the daemon enters state 622, Time Out. In state 622, if the daemon determines that the file is open, the daemon closes the file. The daemon proceeds to state 624, Error Handling, where additional steps for error handling may be taken such sending a message such as notifying the client module of the error such as a lack of response from the client module subsequent to the daemon opening a file. The daemon continues to state 612, Close Thread, where the current thread is closed and the daemon returns to the Daemon Idle state 602.

From state 620, Thread Idle, the daemon waits while, in some embodiments, the client module applies a binary randomization to the original library and generates randomly reorganized machine code portions corresponding to the functional blocks of the original library. The transformation library writes (to the file identified by the file descriptor received from the daemon in state 618) the randomly reorganized machine code portions. Further, the transformation library appends (to the file) writable fixup data and sends a message to the daemon indicating that the operation is complete. For example, the writable fixup data can be library-specific metadata describing memory addresses of the randomly reorganized machine code portions. Upon receiving the message, the daemon proceeds to state 626, Seal Binary. At state 626, the daemon protects the file by changing the permissions from writable to read-only.

Finally, the daemon continues to state 612, Close Thread, where the current thread is closed and the daemon returns to the Daemon Idle (state 602).

In some embodiments, the daemon may perform cache size management routines at various states. Examples of cache size management routines can be reading the cache size, releasing libraries, polling and other suitable tasks. In some embodiments, these tasks would be managed either immediately after or during state 612, Close Thread, but could also be managed at any other point such as daemon idle 602, thread idle 620, opening or closing the thread 604 and 612, or sealing the library 626. In some embodiments, the size of the cache memory (where the transformed library is stored) is tunable or changeable.

Figure 8:
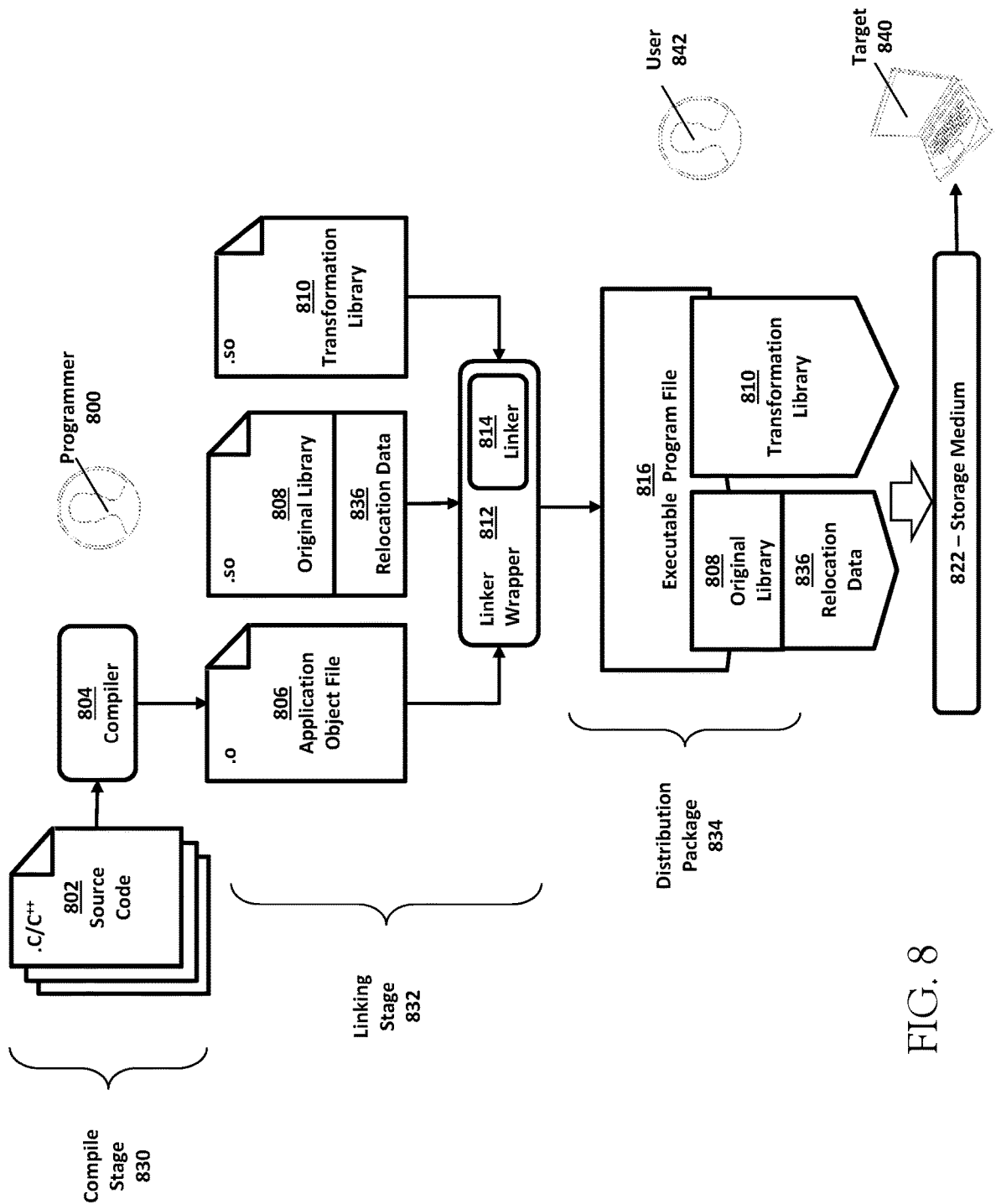
FIG. 8 shows an example development process utilized by a programmer to create a randomized library-enabled application, in accordance with an embodiment of the present disclosure.

FIG. 8 shows a high-level overview of an application development process from the coding of the application to the application being distributed onto a target system 840. The application development process starts an application source code 802 typically written by a programmer 800. In accordance with disclosed embodiments, the application source code 802 includes calls to functions which reside in libraries external to or outside of the application source code file. As an example, the source code 802 includes calls to functions residing in the original library 808. The original library 808 can include relocation data 836 produced when the original library was built from source code to an object code file with support for transformation. As shown in FIG. 8, during the compile stage 830, the compiler 804 takes (as input) the application source code 802 with calls to externally referenced functions residing in both the original library 808 and transformation library 810, and produces the application object file 806. In other words, the application object file 806 is the object file of the source code 802.

The second step in the application development process shown in FIG. 8 is performed by the linker 814 (e.g., linking stage 832). The linker 814 takes (as input) the application object file 806, the original library 808, and the transformation library 810 to create a single executable program file 816 (or, simply executable program 816) which may be executed on a target machine 840. In various embodiments, the functions included in the transformation library 810 may be either dynamically linked by the linker (as shown), written into the source code, or statically linked and thereby embedded in the application object code 806 following compilation. Generally, the overall purpose of transformation library 810 is to perform random relocation or reorganization of the functions in the original library 808 and manage provisions to enable sharing of the resulting transformed library. The source code 802 can include references (e.g., which get translated to dynamic links during linking stage 832) to the original library 808 and the transformation library 810. Further, the application object file 806, the original library 808, and the transformation library 810 can include additional metadata in their ELF header for resolving symbolic cross-references between different modules, code relocation information, stack unwinding information, comments, program symbols, debugging, or profiling information.

In some embodiments, for example, as shown in FIG. 8, in addition to the standard linker 814, a linker wrapper 812 is provided. The linker wrapper 812 appends the call for transformation as a constructor to the executable program file prior to the application code. The result of the linker 814 and linker wrapper 812 is an executable program file 816 including ELF headers. The executable program file 816 is further composed of machine code that includes calls to functions in the transformation library 810 and calls to functions in the original library 808 and information corresponding to the relocation data 836 from the original library. As the outcome of the linking stage 832, the functions in the transformation library 810 and the functions in the original library 808 are dynamically linked to the executable program file 816. In some embodiments, the executable program file 816, the transformation library 810, and the original library 808 are separate files and the combination makes up the distribution package 834. The distribution package 834 may be placed on a storage medium 822 connected to a target system 840 for use by a user 842.

Figure 9:
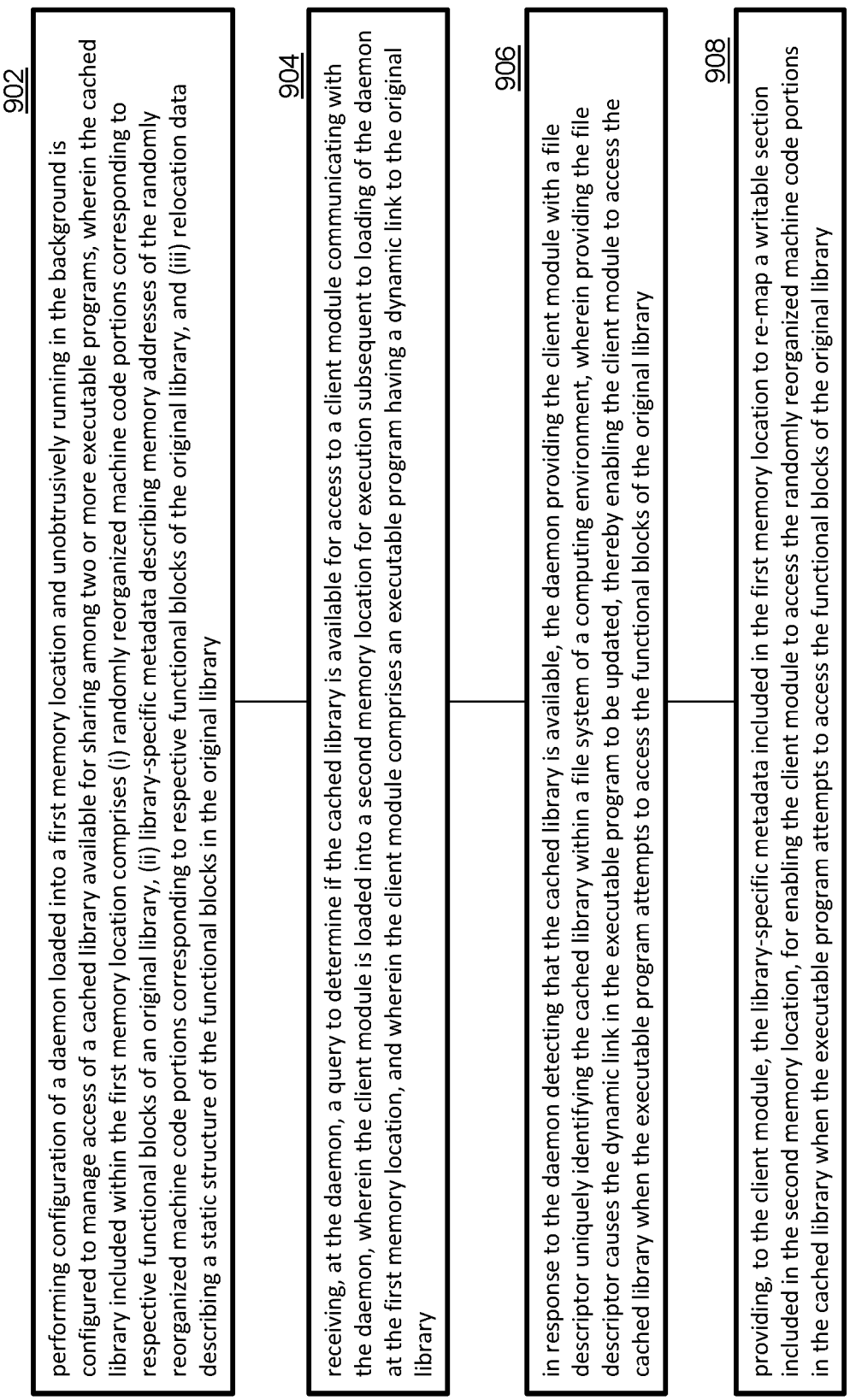
FIG. 9 shows a flowchart of steps for enabling efficient memory access of a library that has undergone a transformation to impede cyberattacks, in accordance with an embodiment of the present disclosure.

FIG. 9 shows a flowchart of steps for enabling efficient memory access of a library that has undergone a transformation to impede cyberattacks. The steps discussed in this flowchart are preferably from the perspective of a daemon within a computing environment and managing sharing of the library. The steps of this flowchart can be regarded as being implemented by a process implemented by the daemon. In connection with FIG. 9, an original library and a cached library are discussed. Any of these libraries can store a collection of resources used by computer programs. Examples of resources may include configuration data, documentation, help data, message templates, functions and subroutines, classes, values, or type specifications. Computer code in the cached library is organized in such a way that it can be used by multiple programs that have no connection to each other. In some embodiments, the cached library is a transformed version of an original library—the transformation providing cybersecurity protection from malicious hackers. Although the cached library and the original library are structured differently in memory, the cached library is functionally equivalent to the original library. Thus, to an executable program intending to access the original library, the cached library will not appear any different. One patentable benefit of making a cached library (which is a transformed version of an original library) available for sharing is that memory access to the library by the multiple executable programs is more efficient and yet the risk of getting hacked is minimized.

At step 902, the daemon is configured inside a computing environment. The configuration can include loading the daemon at a first memory location within the computing environment. In some embodiments, the daemon process unobtrusively runs in the background of the computing environment. The computing environment can include a kernel of an operating system, associated memory, and the daemon which is configured to communicate with a client module (regarded as a combined computational unit involving the executable program and the transformation module) using an IPC technique via the kernel. The daemon can also be configured to manage access of a cached library available for sharing among two or more executable programs. The cached library can be included within the first memory location (i.e., where the daemon resides). The cached library can include (i) randomly reorganized machine code portions corresponding to respective functional blocks of the original library, (ii) library-specific metadata describing memory addresses of the randomly reorganized machine code portions corresponding to respective functional blocks of the original library, and (iii) relocation data describing a static structure of the functional blocks in the original library. According to disclosed embodiments, a binary transformation applied to an original library causes the randomly reorganized machine code portions to be generated. The binary transformation can be applied by a library transformation module (or, simply a transformation module). The library-specific metadata can be considered to be metadata that is specifically associated with (or "tied to") the cached library. In other words, if a library A and a library B were both stored in the cache, the library-specific metadata for library A would be different from the library-specific metadata for library B.

At step 904, the daemon receives a query to determine if the cached library is available for access to a client module communicating with the daemon. For example, the client module can be regarded as a computing module involving an executable program and the transformation module. The executable program can be the program that has access (via a first dynamic link) to the original library and the transformation module can be a function randomization library that causes the randomly reorganized machine code portions to be generated. In some embodiments, the client module can be loaded into a second memory location for execution subsequent to loading of the daemon at the first memory location. In some embodiments, in addition to the dynamic link to the original library, the executable program can have a plurality of dynamic links connecting to a plurality of libraries. The methods discussed for the transformation and caching of a library may be repeated indefinitely, thereby creating additional cached libraries within the daemon.

In response to the daemon determining that the cached library is available, at step 906, the daemon provides the client module with a file descriptor uniquely identifying the cached library within a file system of a computing environment. For example, determining that the cached library is available can be based on a match between a binary identifier included in the query and a key value store in a database. The binary identifier included in the query can reference the original library requested by the client module. The executable program may not be aware of the existence of a transformed library, and hence the query from the executable program references the original library.

In response to the daemon detecting that the cached library is unavailable, the daemon creates a new file with a file descriptor and provides the transformation module with the file descriptor. Accordingly, the transformation module uses the file to store a transformed version of the original library. The transformed version of the original library includes both randomly reorganized blocks of machine code corresponding to functional blocks of the original library and library-specific metadata. Upon receiving a message from the transformation module that the transformation is completed, the daemon seals the file and locks the file for read-only access.

At step 908, the daemon provides (to the client module) the library-specific metadata (e.g., received at step 902) to re-map a writable section included in the second memory location. For example, re-mapping the writable section enables the client module to access the randomly reorganized machine code portions in the cached library when the executable program attempts to access the functional blocks of the original library.

In some embodiments, the daemon is configured to maintain a timer having a predefined expiration time. For example, the timer starts upon creating the cache library, and upon the timer crossing a threshold defined by the predefined expiration time, the daemon releases the memory occupied by the cached library. This feature also provides the benefit of reduced memory consumption.

In some embodiments, the daemon is configured to compute a sum total of memory occupied by one or more cached libraries stored in the daemon, and upon the sum total of memory exceeding a maximum allowable cache size, the daemon releases the sum total of memory occupied by the one or more cached libraries. This feature also provides the benefit of reduced memory consumption. In some embodiments, upon releasing the sum total of memory occupied by the cached libraries residing in the daemon, an error message is generated (by the daemon) in an event when the computing module attempts to access the one or more cached libraries.

Figure 10:
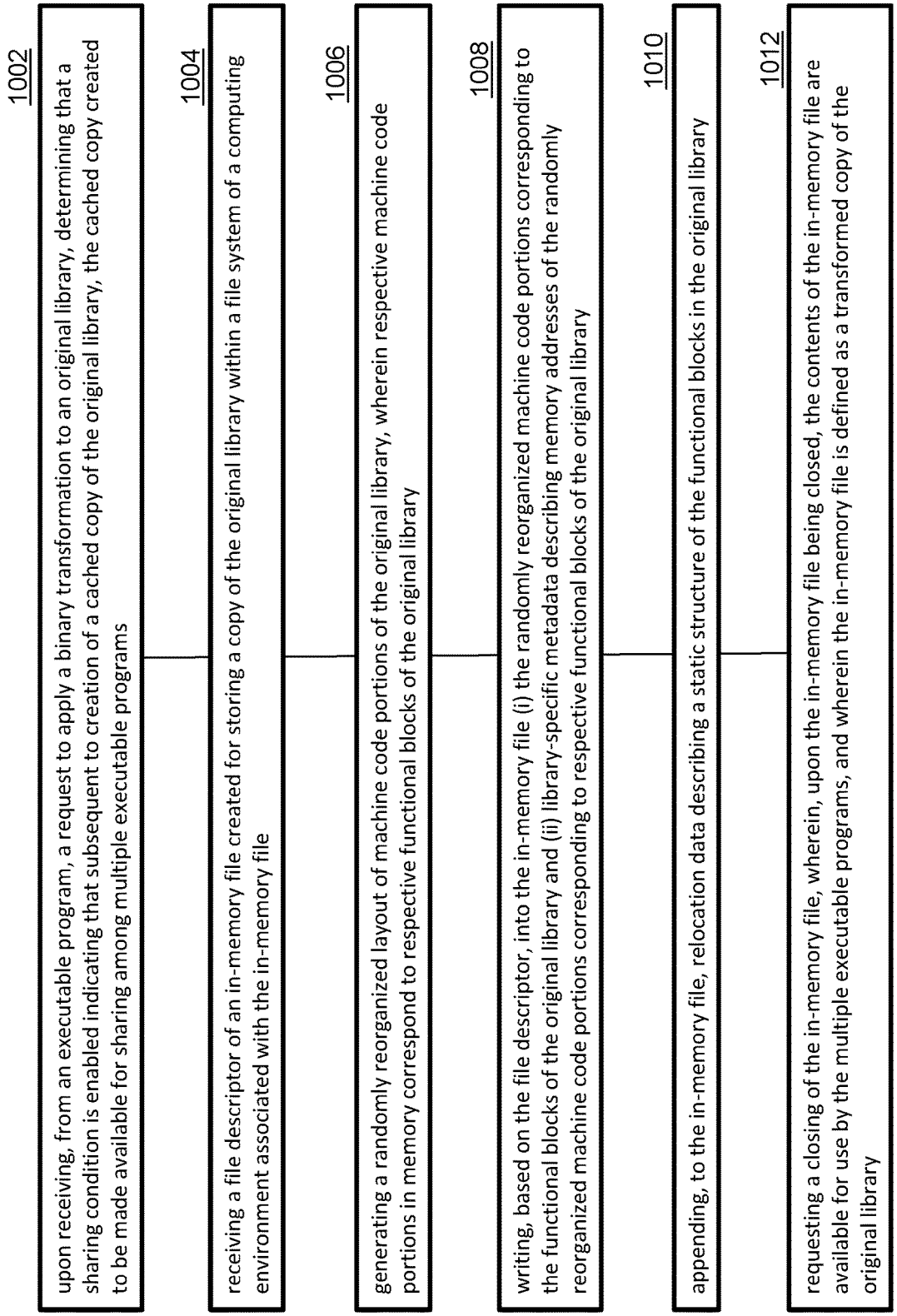
FIG. 10 shows a flowchart of steps for transforming an original library comprising computer code to impede cyberattacks, in accordance with an embodiment of the present disclosure.

FIG. 10 shows a flowchart of steps for creating a transformed version of an original library to impede cyberattacks. As a result of transformation, the resulting library (which can be stored in a cache as a cached library) poses less cybersecurity risk and yet allows efficient sharing and utilization by multiple executable programs. The steps discussed in this flowchart are preferably from the perspective of a transformation library or a transformation module within a computing environment. The transformation module is configured to apply a binary transformation to an original library dynamically linked to an executable program subsequent to load time, that is, when the executable program is loaded into memory. For example, the executable program can call the transformation module which causes the binary transformation to be applied to the original library. The transformation is applied prior to executing the primary function of the executable program (i.e., word processing, database management, etc.). In FIG. 10, the term "client module" can be a computing module including the transformation module and the executable program that is requesting to apply a binary transformation to an original library.

At step 1002, the transformation module receives a request to apply a binary transformation to an original library. Furthermore, in step 1002, the transformation module determines that a sharing condition (e.g., based on a flag, a setting of an environmental variable, white-list or black-list of libraries which may or may not be shared, or simply the availability of the library) is enabled. The sharing condition may indicate that subsequent to creation of a cached copy of the original library, the cached copy will be made available for sharing among multiple executable programs. The cached copy of the original library is essentially a transformed version of the original library.

Upon receiving the request, the transformation module can send a query to a daemon to determine if the cached copy of the original library exists. For example, the daemon can exist in the memory and the cached copy of the original library can exist within the daemon. The daemon, unobtrusively running in the background, can be configured to manage sharing of contents of the transformed copy (or, otherwise the cached copy) of the original library among multiple executable programs. In some embodiments, although sharing of a cached copy of an original library may be enabled, an executable program may not have necessary authorization to create the cached copy. Thus, in some embodiments, the query from the transformation module to the daemon can include a unique process ID associated with a permission level of a client module.

Accordingly, the transformation module receives a response from the daemon. The response can indicate one of the following conditions: (1) a cached copy of the original library is available within the daemon, (2) a cached copy of the original library does not exist and the transformation module may create a cached copy, and (3) a cached copy of the original library does not exist but the client module has insufficient permission levels to create a cached copy.

If the response from the daemon indicates the condition that a cached copy of the original library is available within the daemon, then the transformation module receives (from the daemon) a file descriptor uniquely identifying the cached library within a file system of a computing environment. Next, the transformation library uses the file descriptor to update a dynamic link in the executable program, which enables the client module to access the cached library when the executable program attempts to access the functional blocks of the original library.

If the response from the daemon indicates that a cached copy of the original library does not exist but the client module has insufficient permission levels to create a cached copy, then the transformation module can create (and subsequently provide) a local library to be accessed exclusively by the client module. The local library, for example, can be a restructured or transformed version of the original library—the restructuring can essentially be a transformation applied to the original library for exclusive access of the executable program, and no other executable programs are permitted access to the local library. In some embodiments, the daemon can detect that the client module has insufficient permission levels to create a cached copy based on the unique process ID associated with the client module. The unique process ID was included in the query sent to the daemon from the transformation module. For example, in a use-case when the client module has insufficient permission levels, the response from the daemon (to the transformation module) may include a predetermined value corresponding to non-authorization of the executable program.

In a case that the response from the daemon to the query by the transformation module indicates that the cached copy of the original library does not exist and that the transformation module may create a cached copy to be stored in the daemon, then the transformation module enters step 1004 shown in FIG. 10. In step 1004, the transformation module receives a file descriptor of an in-memory file (e.g., created by the daemon) for storing a copy of the original library within a file system of a computing environment associated with the in-memory file. At step 1006, the transformation module generates a randomly reorganized layout of machine code portions of the original library using the relocation data and the memory addresses of functional blocks within the original library. The relocation data describes a static structure of the functional blocks in the original library and is available during compilation/linking of the executable program. Generating the randomly reorganized layout can include making appropriate corrections within the machine code portions. Examples of corrections can include adding data address offsets and/or changing the branch address(es). The respective machine code portions in memory can correspond to respective functions or functional blocks of the original library. Library-specific metadata describing the memory addresses of the randomly reorganized machine code portions can be generated dynamically by the transformation module. Thus, generating the randomly reorganized layout of machine code portions of the original library can include generating the library-specific metadata. The library-specific metadata can be regarded as specific or exclusive to a given library and executable program. For example, the library metadata can uniquely identify the specific memory locations (e.g., within the restructured library) where the randomly reorganized machine code portions reside. In some embodiments, the library-specific metadata can include a randomization seed value of a pseudorandom generator used for generating the randomly reorganized machine code portions in the cached library.

At step 1008, the transformation module writes (based on the file descriptor received in step 1006) the randomly reorganized machine code portions and the library-specific metadata to the in-memory file associated with the file descriptor. At step 1010, the transformation module appends relocation data (describing a static structure of the functional blocks in the original library) to the in-memory file. For example, the relocation data can be used to map the executable program to the randomly reorganized machine code portions. Without the relocation data, the executable program would not be correctly mapped by the transformation module to the randomly reorganized machine code portions of the original library. For example, the relocation data is extracted from an object file associated with the original copy of the library and includes information regarding sizes, references, and boundaries of the functional blocks included in the original copy of the library as it appears on a storage medium. Thus, the relocation data can be considered to be "static."

Next, the transformation module updates (using the file descriptor of the in-memory file) a dynamic link included in the executable program, for example, the dynamic link connecting the executable program with the original library. Updating the link causes the transformed copy of the original library to be accessed instead of the original library. At step 1012, the transformation module requests the daemon to close the in-memory file. It will be understood that the in-memory file is defined as a transformed copy of the original library. Consequently, upon the in-memory file being closed, the contents of the in-memory file are available for use by multiple executable programs, wherein the in-memory file is defined as a transformed copy of the original library.

In some embodiments, sharing of the cached library may be disabled. For example, this may be due to security reasons or sole ownership reasons. If the transformation module determines that sharing of an existing cached library (by multiple executable programs) is disabled, and yet an executable program sends a request in step 1002 to create a transformed library, then in such scenarios, the transformation module can create a local library that is not cached in the daemon to be accessed exclusively by the executable program. The local library essentially can be accessed by a single client module involving the transformation module and the executable program. Creating the local library for exclusive access by the executable program would prevent other executable programs from accessing the local library. The local library, for example, can be a restructured or transformed version of the original library—the restructuring can essentially be a transformation applied to the original library for exclusive access. After creating a local library, the transformation module can update one or more writable sections in the memory occupied by the executable program. For example, updating the one or more writable sections enables the client module to access the randomly reorganized machine code portions in the local library when the executable program attempts to access the functional blocks of the original library.

Some embodiments of the present technology are now discussed in clause-based format. For example, the embodiment discussed below is directed at a use-case from a perspective of a daemon storing a cached library that is unavailable for sharing among two or more executable programs.

C1. A method of enabling efficient memory access to a computer code library that has undergone transformation to impede cyberattacks, the method comprising:

performing configuration of a daemon loaded into a first memory location, unobtrusively runs in the background and is configured to manage access of a cached library available for sharing among two or more executable programs, wherein the cached library included within the first memory location comprises (i) randomly reorganized machine code portions corresponding to respective functional blocks of an original library, (ii) library-specific metadata describing memory addresses of the randomly reorganized machine code portions corresponding to respective functional blocks of the original library, and (iii) relocation data describing a static structure of the functional blocks in the original library;

receiving, at the daemon, a query to determine if the cached library is available for access to a client module communicating with the daemon, wherein the client module is loaded into a second memory location for execution subsequent to loading of the daemon at the first memory location, and wherein the client module comprises an executable program having a dynamic link to the original library;

in response to the daemon detecting that the cached library is unavailable, the daemon opening a new in-memory file residing within the daemon;

providing the client module with a file descriptor uniquely identifying the file within a file system of a computing environment, wherein providing the file descriptor allows the client module to write the cached library into the file; and upon receiving communication from the client module that writing into the in-memory file is complete, the daemon closing the file, wherein a completion of writing includes adding the cached library into the file.

C2. The method of clause C1, wherein subsequent to closing the file, the daemon changes a file access criterion associated with the file from writable to read-only.

C3. The method of clause C1, wherein subsequent to opening the file, the daemon updates a key value store existing in the daemon with information correlating a binary identifier of the original library to the file descriptor of the file.

The embodiments or portions thereof of the system and method of the present invention may be implemented in computer hardware, firmware, and/or computer programs executing on programmable computers or servers that each include a processor and a storage medium readable by the processor (including volatile and non-volatile memory and/or storage elements). Any computer program may be implemented in a high-level procedural or object-oriented programming language to communicate within and outside of computer-based systems.

Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, may also be implemented as a machine-readable storage medium, configured with a computer program, where, upon execution, instructions in the computer program cause a machine to operate to perform the functions of the embodiments described above.

The embodiments, or portions thereof, of the system and method of the present invention described above may be used in a variety of applications. Although the embodiments, or portions thereof, are not limited in this respect, the embodiments, or portions thereof, may be implemented with memory devices in microcontrollers, general purpose microprocessors, digital signal processors (DSPs), reduced instruction-set computing (RISC), and complex instruction set computing (CISC), among other electronic components. Moreover, the embodiments, or portions thereof, described above may also be implemented using integrated circuit blocks referred to as main memory, cache memory, or other types of memory that store electronic instructions to be executed by a microprocessor or store data that may be used in arithmetic operations.

The descriptions are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory.

Various modifications to the disclosed embodiments will be apparent to those skilled in the art, and the general principals set forth below may be applied to other embodiments and applications. Thus, the present disclosure is not intended to be limited to the embodiments shown or described herein.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes.

We claim:

1. A method of enabling efficient memory access to a computer code library that has undergone transformation to impede cyberattacks, the method comprising:

performing configuration of a daemon loaded into a first memory location and unobtrusively running in the background is configured to manage access of a cached library available for sharing among two or more executable programs, wherein the cached library included within the first memory location comprises (i) randomly reorganized machine code portions corresponding to respective functional blocks of an original library, (ii) library-specific metadata describing memory addresses of the randomly reorganized machine code portions corresponding to respective functional blocks of the original library, and (iii) relocation data describing a static structure of the functional blocks in the original library;

receiving, at the daemon, a query to determine if the cached library is available for access to a client module communicating with the daemon, wherein the client module is loaded into a second memory location for execution subsequent to loading of the daemon at the first memory location, and wherein the client module comprises an executable program having a dynamic link to the original library;

in response to the daemon detecting that the cached library is available, the daemon providing the client module with a file descriptor uniquely identifying the cached library within a file system of a computing environment, wherein providing the file descriptor causes the dynamic link in the executable program to be updated, thereby enabling the client module to access the cached library when the executable program attempts to access the functional blocks of the original library; and providing, to the client module, the library-specific metadata included in the first memory location to re-map a writable section included in the second memory location, for enabling the client module to access the randomly reorganized machine code portions in the cached library when the executable program attempts to access the functional blocks of the original library.

2. The method of claim 1, wherein determining if the cached library is available is based on a match between a binary identifier included in the query and a key value store in a database, wherein the binary identifier included in the query references the original library requested by the client module.

3. The method of claim 1, wherein the cached library is a transformed version of the original library based on applying a binary transformation to the original library, wherein the binary transformation causes generation of the randomly reorganized machine code portions in the cached library.

4. The method of claim 1, wherein the executable program is dynamically linked to the library transformation module, and wherein the library transformation module is accessible by the two or more executable programs, and the transformation module is configured to generate the randomly reorganized machine code portions in the cached library.

5. The method of claim 1, wherein the computing environment includes a kernel of an operating system, and wherein the daemon communicates with the client module using an inter-process communication (IPC) technique via the kernel.

6. The method of claim 1, wherein providing the file descriptor causes the dynamic link in the executable program to be updated, thereby allowing release of memory occupied by the original library, thereby resulting in reduced memory consumption.

7. The method of claim 1, wherein the daemon is configured to maintain a timer having a predefined expiration time, wherein the timer is configured to start upon creating the cache library, and upon the timer crossing a threshold defined by the predefined expiration time, the daemon releases the memory occupied by the cached library.

8. The method of claim 1, wherein the daemon is configured to compute a sum total of memory occupied by one or more cached libraries stored in the daemon, and upon the sum total of memory exceeding a maximum allowable cache size, the daemon releases the sum total of memory occupied by the one or more cached libraries.

9. The method of claim 8, wherein upon releasing the sum total of memory occupied by the one or more cached libraries, the daemon generates an error message in an event that the computing module attempts to access the one or more cached libraries.

10. A method of transforming an original library comprising computer code to impede cyberattacks, the resulting library configured for efficient sharing and utilization by multiple executable programs, the method comprising:

upon receiving, from an executable program, a request for application of a binary transformation to an original library, determining that a sharing condition is enabled indicating that subsequent to creation of a cached copy of the original library, the cached copy to be made available for sharing among multiple executable programs;

receiving a file descriptor of an in-memory file created for storing a copy of the original library within a file system of a computing environment associated with the in-memory file;

generating a randomly reorganized layout of machine code portions of the original library, wherein respective machine code portions in memory correspond to respective functional blocks of the original library;

writing, based on the file descriptor, into the in-memory file (i) the randomly reorganized machine code portions corresponding to the functional blocks of the original library and (ii) library-specific metadata describing memory addresses of the randomly reorganized machine code portions corresponding to respective functional blocks of the original library;

appending, to the in-memory file, relocation data describing a static structure of the functional blocks in the original library; and requesting a closing of the in-memory file, wherein, upon the in-memory file being closed, the contents of the in-memory file are available for use by the multiple executable programs, and wherein the in-memory file is defined as a transformed copy of the original library.

11. The method of claim 10, wherein determining that the sharing condition is enabled is based on a setting of an environmental variable indicating that the library specified in the request is available to be shared.

12. The method of claim 10, further comprising:
upon determining that the sharing condition is disabled, creating a local library to be accessed exclusively by a single client module, thereby preventing other executable programs from accessing the local library, wherein the local library is a restructured version of the original library.

13. The method of claim 10, wherein the relocation data is extracted from an object file associated with the original copy of the library and includes information regarding sizes, references, and boundaries of the functional blocks included in the original copy of the library.

14. The method of claim 10, wherein the relocation data is used to map the executable program to the randomly reorganized machine code portions corresponding to the functional blocks of the original copy of the library.

15. The method of claim 10, wherein the transformed copy of the original library is available in a cache of a daemon unobtrusively running in the background and configured to manage sharing of contents of the transformed copy of the original library among more than one executable program.

16. The method of claim 10, further comprising:
updating, using the file descriptor of the in-memory file, a dynamic link included in the executable program connecting the executable program with the original library, thereby causing the transformed copy of the original library to be accessed instead of the original library.

17. The method of claim 10, wherein the library-specific metadata describing the memory addresses of the randomly reorganized machine code portions corresponding to respective functional blocks of the original library is generated during execution of the executable program requesting the application of the binary transformation.

18. The method of claim 10, wherein, prior to receiving the file descriptor, further comprising:
upon determining that sharing is enabled, sending a request to a daemon to determine if the cached copy of the original library exists within the daemon, wherein the request includes a process ID associated with a permission level of the executable program; and
receiving a response from the daemon with the file descriptor, wherein the executable program has a permission level to apply the binary transformation of the original library.

19. The method of claim 10, further comprising:
upon determining that sharing is enabled, sending a request to a daemon to determine if the cached copy of the original library exists within the daemon, wherein the request includes a process ID associated with a permission level of a client module including the executable program;
upon receiving a response from the daemon indicating a predetermined value corresponding to non-authorization of the executable program, creating a local library to be accessed exclusively by a single client module, thereby preventing other executable programs from accessing the local library; and
providing the local library to the client module, wherein the local library is a restructured version of the original library.

* * * * *